(12) United States Patent (10) Patent No.: US 12,210,848 B2
Garcia et al. (45) Date of Patent: Jan. 28, 2025

(54) TECHNIQUES AND MODELS FOR MULTILINGUAL TEXT REWRITING

(71) Applicant: Google LLC, Mountain View, CA (US)

(72) Inventors: Xavier Eduardo Garcia, New York, NY (US); Orhan Firat, New York, NY (US); Noah Constant, Cupertino, CA (US); Xiaoyue Guo, San Francisco, CA (US); Parker Riley, Mountain View, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 17/682,282

(22) Filed: Feb. 28, 2022

(65) Prior Publication Data

US 2023/0274100 A1 Aug. 31, 2023

(51) Int. Cl.
*G06F 40/58* (2020.01)
*G06F 40/166* (2020.01)
*G06F 40/197* (2020.01)
*G06F 40/253* (2020.01)
*G06F 40/56* (2020.01)
*G06N 3/045* (2023.01)
*G06N 3/047* (2023.01)
(Continued)

(52) U.S. Cl.
CPC ............ *G06F 40/58* (2020.01); *G06F 40/166* (2020.01); *G06F 40/197* (2020.01); *G06F 40/253* (2020.01); *G06F 40/56* (2020.01); *G06N 3/045* (2023.01); *G06N 3/047* (2023.01); *G06N 3/08* (2013.01); *G06N 3/084* (2013.01)

(58) Field of Classification Search
CPC .......... G06F 40/58; G06F 40/166; G06N 3/08
See application file for complete search history.

(56) References Cited

U.S. PATENT DOCUMENTS 7,085,707 B2 * 8/2006 Milner ................... G09B 19/06
704/4
8,032,355 B2 * 10/2011 Narayanan .............. G06F 40/55
704/277

(Continued)

OTHER PUBLICATIONS

Sandeep Subramanian, "Multiple-Attribute Text Style Transfer", Nov. 1, 2018, 20 pages https://doi.org/10.48550/arXiv.1811.00552 (Year: 2018).*

(Continued)

*Primary Examiner* — Benjamin Smith
(74) *Attorney, Agent, or Firm* — Botos Churchill IP Law

(57) ABSTRACT

The technology provides a model-based approach for multilingual text rewriting that is applicable across many languages and across different styles including formality levels or other textual attributes. The model is configured to manipulate both language and textual attributes jointly. This approach supports zero-shot formality-sensitive translation, with no labeled data in the target language. An encoder-decoder architectural approach with attribute extraction is used to train rewriter models that can thus be used in "universal" textual rewriting across many different languages. A cross-lingual learning signal can be incorporated into the training approach. Certain training processes do not employ any exemplars. This approach enables not just straight translation, but also the ability to create new sentences with different attributes.

25 Claims, 22 Drawing Sheets

(51) Int. Cl.
  *G06N 3/08* (2023.01)
  *G06N 3/084* (2023.01)

(56) References Cited

U.S. PATENT DOCUMENTS

| | | | | |
|---|---|---|---|---|
| 9,009,027 | B2* | 4/2015 | Lehman | G06F 40/30 |
| | | | | 704/10 |
| 9,201,866 | B2* | 12/2015 | Lehman | G06F 40/253 |
| 9,342,509 | B2* | 5/2016 | Meng | G10L 13/08 |
| 10,418,023 | B2* | 9/2019 | Jiang | G10L 13/047 |
| 10,423,722 | B2* | 9/2019 | Gardner | G06F 40/253 |
| 10,606,943 | B2* | 3/2020 | Cunico | G06F 40/253 |
| 10,789,430 | B2* | 9/2020 | Lev Tov | G06F 40/30 |
| 10,891,435 | B1* | 1/2021 | Ruiz | G06F 40/30 |
| 10,902,188 | B2* | 1/2021 | Ragan, Jr. | G06F 40/166 |
| 10,977,439 | B2* | 4/2021 | Mishra | G06N 3/088 |
| 11,030,990 | B2* | 6/2021 | Jiang | G10L 13/047 |
| 11,037,028 | B2* | 6/2021 | Bojar | G06F 40/58 |
| 11,068,654 | B2* | 7/2021 | Beller | G06F 40/284 |
| 11,138,392 | B2* | 10/2021 | Chen | G06N 3/082 |
| 11,151,334 | B2* | 10/2021 | Rezagholizadeh | G06F 40/58 |
| 11,194,971 | B1* | 12/2021 | Dobranic | G06V 30/18 |
| 11,200,881 | B2* | 12/2021 | Witherspoon | G06F 40/30 |
| 11,202,131 | B2* | 12/2021 | Zass | G10L 13/00 |
| 11,210,477 | B2* | 12/2021 | Srinivasan | G06F 40/47 |
| 11,314,950 | B2* | 4/2022 | Wu | G06F 40/56 |
| 11,429,785 | B2* | 8/2022 | Kwon | G06F 40/56 |
| 11,475,223 | B2* | 10/2022 | Chhaya | G06N 3/044 |
| 11,487,971 | B2* | 11/2022 | Goyal | G06F 18/2155 |
| 11,551,011 | B2* | 1/2023 | Lev-Tov | G06F 40/30 |
| 11,562,148 | B2* | 1/2023 | Lev-Tov | G06F 18/2155 |
| 11,574,132 | B2* | 2/2023 | Jain | G06N 3/088 |
| 11,586,828 | B2* | 2/2023 | Lev-Tov | G06F 40/30 |
| 11,586,830 | B2* | 2/2023 | Maheswaran | G06F 40/56 |
| 11,587,561 | B2* | 2/2023 | Weir | G10L 15/1815 |
| 11,610,061 | B2* | 3/2023 | Eisenschlos | G06F 40/253 |
| 11,630,959 | B1* | 4/2023 | Dobranic | G06V 30/10 |
| | | | | 704/9 |
| 11,645,478 | B2* | 5/2023 | Tambi | G06F 40/56 |
| | | | | 704/2 |
| 11,694,042 | B2* | 7/2023 | Fei | G06F 40/197 |
| | | | | 704/2 |
| 11,741,190 | B2* | 8/2023 | Goyal | G06F 40/30 |
| | | | | 704/9 |
| 11,763,085 | B1* | 9/2023 | Alikaniotis | G06N 20/00 |
| | | | | 704/9 |
| 2003/0203343 | A1* | 10/2003 | Milner | G09B 19/06 |
| | | | | 434/156 |
| 2005/0075880 | A1* | 4/2005 | Pickover | G06F 40/253 |
| | | | | 704/270 |
| 2007/0294077 | A1* | 12/2007 | Narayanan | G06F 40/284 |
| | | | | 704/2 |
| 2010/0114556 | A1* | 5/2010 | Meng | G10L 13/08 |
| | | | | 704/E17.001 |
| 2010/0217582 | A1* | 8/2010 | Waibel | G10L 15/22 |
| | | | | 704/7 |
| 2013/0325437 | A1* | 12/2013 | Lehman | G06F 40/253 |
| | | | | 704/9 |
| 2015/0120283 | A1* | 4/2015 | Lehman | G06F 40/253 |
| | | | | 704/9 |
| 2015/0254238 | A1* | 9/2015 | Waibel | G06F 40/58 |
| | | | | 704/4 |
| 2019/0108212 | A1* | 4/2019 | Cunico | G06F 40/253 |
| 2019/0108213 | A1* | 4/2019 | Cunico | G06F 40/253 |
| 2019/0115008 | A1* | 4/2019 | Jiang | G10L 15/22 |
| 2019/0392813 | A1* | 12/2019 | Jiang | G10L 13/047 |
| 2020/0057798 | A1* | 2/2020 | Ragan, Jr. | G06F 40/166 |
| 2020/0097554 | A1* | 3/2020 | Rezagholizadeh | G06N 3/08 |
| 2020/0110797 | A1* | 4/2020 | Melnyk | G06F 40/58 |
| 2020/0159826 | A1* | 5/2020 | Lev Tov | G06F 40/35 |
| 2020/0210772 | A1* | 7/2020 | Bojar | G06F 18/2148 |
| 2020/0311195 | A1* | 10/2020 | Mishra | G06F 40/253 |
| 2020/0356634 | A1* | 11/2020 | Srinivasan | G06F 40/30 |
| 2020/0387674 | A1* | 12/2020 | Lev-Tov | G06F 40/35 |
| 2020/0410171 | A1* | 12/2020 | Lev-Tov | G06F 40/30 |
| 2020/0410172 | A1* | 12/2020 | Lev-Tov | G06F 40/284 |
| 2021/0020161 | A1* | 1/2021 | Gao | G10L 13/08 |
| 2021/0027761 | A1* | 1/2021 | Witherspoon | G06N 3/045 |
| 2021/0034705 | A1* | 2/2021 | Chhaya | G06F 40/205 |
| 2021/0165960 | A1* | 6/2021 | Eisenschlos | G06F 40/284 |
| 2021/0303803 | A1* | 9/2021 | Wu | G06N 3/08 |
| 2021/0383074 | A1* | 12/2021 | Maheswaran | G06F 40/40 |
| 2021/0390270 | A1* | 12/2021 | Fei | G06N 3/045 |
| 2021/0397793 | A1* | 12/2021 | Li | G06N 20/00 |
| 2022/0075965 | A1* | 3/2022 | Srinivasan | G06F 40/58 |
| 2022/0121879 | A1* | 4/2022 | Goyal | G06V 30/18057 |
| 2022/0198157 | A1* | 6/2022 | Li | G06F 40/58 |
| 2022/0414400 | A1* | 12/2022 | Goyal | G06F 18/2155 |
| 2023/0026945 | A1* | 1/2023 | Friedlander | G06N 3/045 |
| 2023/0137209 | A1* | 5/2023 | Nangi | G06F 40/216 |
| | | | | 704/9 |
| 2023/0289529 | A1* | 9/2023 | Alikaniotis | G06F 40/211 |
| 2024/0104294 | A1* | 3/2024 | Shen | G06F 40/30 |

OTHER PUBLICATIONS

Lample, Guillaume et al. "Multiple-Attribute Text Rewriting." International Conference on Learning Representations, Sep. 27, 2018, 20 pages, https://openreview.net/pdf?id=H1g2NhC5KQ. (Year: 2018).*

Bandel, Elron et al. "SimpleStyle: An Adaptable Style Transfer Approach." ArXiv abs/2212.10498 (Dec. 2022), 12 pages (Year: 2022).*

Jin, Di et al. "Deep Learning for Text Style Transfer: A Survey." Computational Linguistics 48 (2020): p. 155-205. https://arxiv.org/pdf/2011.00416.pdf (Year: 2020).*

Sudhakar, Akhilesh et al. ""Transforming" Delete, Retrieve, Generate Approach for Controlled Text Style Transfer." Conference on Empirical Methods in Natural Language Processing, Aug. 25, 2019, 11 pages, DOI:10.18653/v1/D19-1322 (Year: 2019).*

MohammadiBaghmolaei, Rezvan and Ali Ahmadi. "TET: Text emotion transfer." Knowledge-Based Systems, Dec. 1, 2022, DOI:10.1016/j.knosys.2022.110236 (Year: 2022).*

Parker Riley et al., "TextSETTR: Label-Free Text Style Extraction and Tunable Targeted Restyling", Version 2, Dec. 29, 2020, 16 pages, https://doi.org/10.48550/arXiv.2010.03802, arXiv:2010.03802v2 (Year: 2020).*

Syed, Bakhtiyar et al. "Adapting Language Models for Non-Parallel Author-Stylized Rewriting." AAAI Conference on Artificial Intelligence, Sep. 22, 2019, 8 pages; DOI:10.1609/AAAI.V34I05.6433 (Year: 2019).*

Zhiqiang Hu, "Text Style Transfer: A Review and Experimental Evaluation" Oct. 24, 2020, 32 pages, https://doi.org/10.48550/arXiv.2010.12742 (Year: 2020).*

Riley, Parker et al. "FRMT: A Benchmark for Few-Shot Region-Aware Machine Translation." ArXiv abs/2210.00193 (Oct. 1, 2022): 15 pages (Year: 2022).*

Shrimai Prabhumoye, "Style Transfer Through Back-Translation", In Proceedings of the 56th Annual Meeting of the Association for Computational Linguistics (vol. 1: Long Papers), pp. 866-876, Melbourne, Australia. Apr. 24, 2018 (Year: 2018).*

Juncen Li; "Delete, Retrieve, Generate: A Simple Approach to Sentiment and Style Transfer"; Apr. 17, 2018, 12 pages, https://doi.org/10.48550/arXiv.1804.06437 (Year: 2018).*

Anumanchipalli, et al., "Intent Transfer in Speech-to-Speech Machine Translation", In IEEE Spoken Language Technology Workshop, Dec. 2, 2012, 6 pages. (Year: 2012).*

Parker Riley et al., "TextSETTR: Label-Free Text Style Extraction and Tunable Targeted Restyling", Version 1, Oct. 8, 2020, 15 pages, https://doi.org/10.48550/arXiv.2010.03802, arXiv:2010.03802v1 (Year: 2020).*

Reif, Emily et al. "A Recipe for Arbitrary Text Style Transfer with Large Language Models." ArXiv abs/2109.03910 ( Sep. 8, 2021): n. pag. 12 pages (Year: 2021).*

Alex York, The Best 10 Wordtune Alternatives for Rewriting Content in 2024, Dec. 19, 2023, 38 pages, https://clickup.com/blog/wordtune-alternatives/ (Year: 2023).*

(56) References Cited

OTHER PUBLICATIONS

Parker Riley, "Text Rewriting with Missing Supervision", PhD Thesis; 2021, 129 pages file:///C:/Users/bsmith3/Downloads/Riley_rochester_0188E_12322.pdf (Year: 2021).*

Mitamura, Teruko, "Controlled Language for Multilingual Machine Translation", Proceedings of Machine Translation Summit VII, Singapore, Sep. 13-17, 1999. 8 pages.

Rosca, Mihaela, et al., "Sequence-to-sequence neural network models for transliteration", arXiv:1610.09565v1 [cs.CL] Oct. 29, 2016, 5 pages.

Sproat, Richard, "Multilingual Text Analysis for Text-to-Speech Synthesis", ECAI 96. 12th European Conference on Artificial Intelligence, cmp-lg/9608012 Aug. 19, 1996, 6 pages.

Riley, Parker, "Text Rewriting with Missing Supervision", Department of Computer Science, University of Rochester, 2021, pp. 1-129.

Riley, Parker, et al., "TextSETTR: Few-Shot Text Style Extraction and Tunable Targeted Restyling", 59th Annual Meeting of the Association for Computational Linguistics and the 11th International Joint Conference on Natural Language Processing, Association for Computational Linguistics, Aug. 1-6, 2021, pp. 2786-3800.

Riley, Parker, et al., "TextSETTR: Few-Shot Text Style Extraction and Tunable Targeted Restyling", arXiv:2010.03802v3, Jun. 23, 2021, pp. 1-15.

* cited by examiner

100

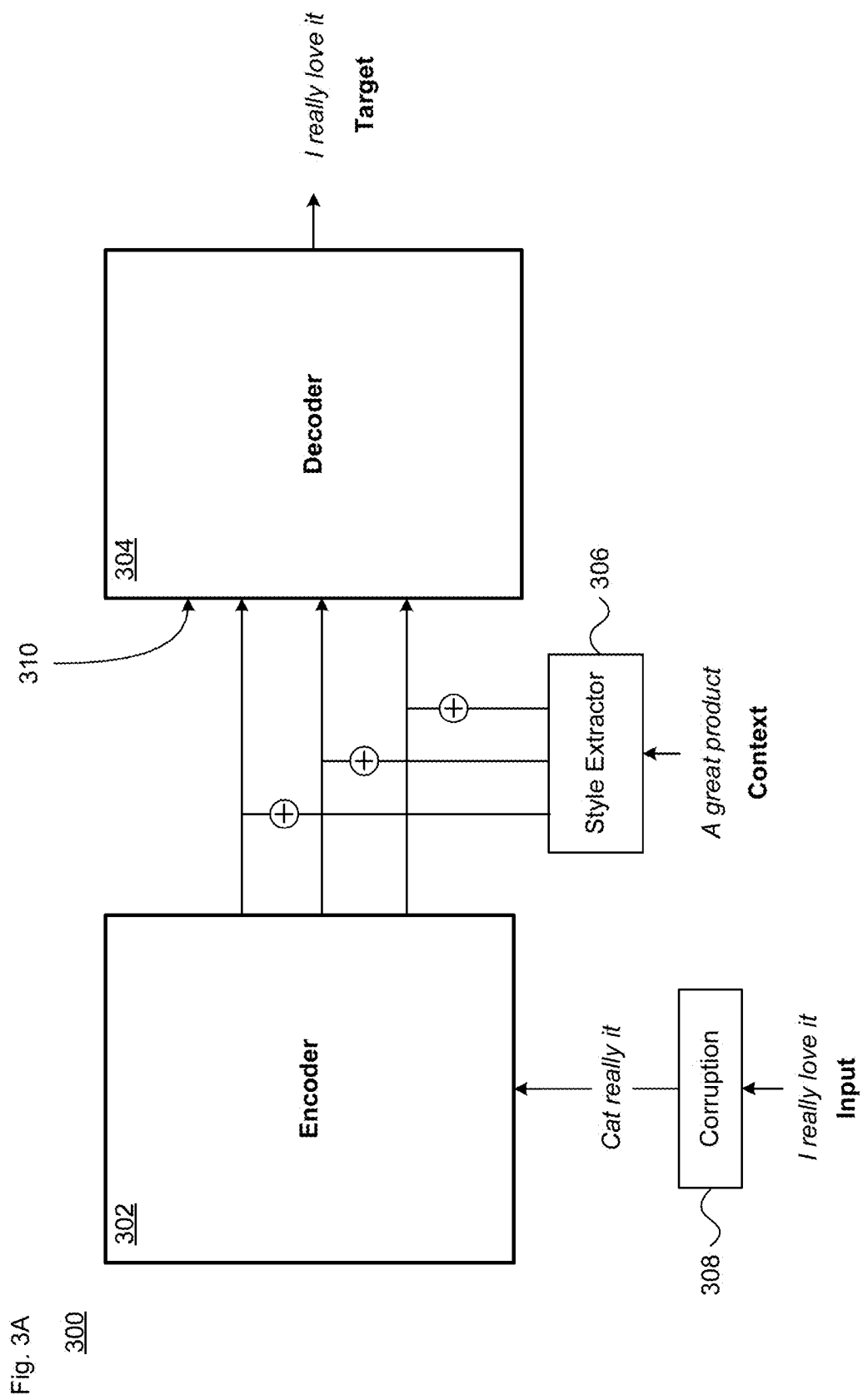

Fig. 4

|  | Model | newstest2019 Gu ↔ En | | newstest2019 Tr ↔ En | | newstest2018 ↔ En | | newstest2019 Kk ↔ En | | newstest2019 ↔ En | |
|---|---|---|---|---|---|---|---|---|---|---|---|
| No parallel data | Universal Rewriter (−para) | 0.5 | 0.3 | 2.1 | 2.0 | | | 0.6 | 1.4 | | |
| | Prior Approach 1 | 0.6 | 0.6 | - | - | | | 0.8 | 2.0 | | |
| No parallel data for {Gu, Kk} | Universal Rewriter | 9.6 | 23.2 | 16.3 | 23.7 | | | 5.8 | 19.8 | | |
| | Universal Rewriter (−lang tokens) | 0.0 | 17.8 | 10.7 | 22.3 | | | 0.6 | 17.8 | | |
| | Universal Rewriter (−exemplars) | 9.0 | 23.8 | 16.7 | 25.0 | | | 5.8 | 20.0 | | |
| | Universal Rewriter (−BT) | 8.8 | 23.0 | 16.5 | 24.0 | | | 5.3 | 19.9 | | |
| | Prior Approach 2 | 4.4 | 19.3 | 8.4 | 15.9 | | | 3.9 | 14.8 | | |
| | Prior Approach 3 | - | 13.8 | 17.8 | 22.5 | | | - | - | | |
| With parallel data for {Gu, Kk} | Prior Approach 2 | 15.5 | 19.3 | 18.1 | 22.0 | | | 9.5 | 15.1 | | |
| | Prior Approach 3 | 0.1 | 0.3 | 17.8 | 22.5 | | | 2.5 | 7.4 | | |

Table 1: BLEU scores of various supervised and unsupervised models for low-resource language pairs Fig. 5
Table 2

| Inputs (Negative) | Predictions (Positive) |
|---|---|
| I was quite disappointed. | I was quite satisfied. |
| J'ai été assez déçu. | J'ai été très satisfait. |
| Ich war ziemlich enttäuscht. | Ich war sehr zufrieden. |
| とてもがっかりしました。 | とても満足しました。 |

Fig. 6A

Positive Exemplars

I really enjoyed this movie.
They thought the food was very tasty.
It was perfect in every single way.
What a fantastic offer!
The most comfortable bed I've ever slept on, I highly recommend it.
I feel very happy.
I had a great time!
You would have loved it!
A high quality item.
An amazing product!

Fig. 6B

Negative Exemplars

I really disliked this movie.
They thought the food was very bland.
It was horrible in every single way.
What a terrible offer!
The most uncomfortable bed I've ever slept on, I would never recommend it.
I feel very sad.
I had an unpleasant time.
You would have hated it.
A low quality item.
An awful product!

Formal Exemplars

This was a remarkably thought-provoking read.
It is without question amongst my favorites.
We humbly request your presence at our gala in the coming week.
Loitering is strictly forbidden on the premises.
Were I to be approached for such a role, it would be the utmost honor.

Fig. 9B

Informal Exemplars reading this rly makes u think
Its def one of my all time favs
come swing by our bbq next week if ya can make it
you're not allowed to hang around here
that would be sooo dope if they pick me for the part Fig. 10A
Table 3A

| Informal |
|---|
| 如果你想买房子你得先看看能不能拿到贷款 |
| もしあなたが家に住み替えたいなら お金を借りて |
| если хочешь купить дом, тебе придется посмотреть, как получить одобрение на кредит. |
| si quieres comprar una casa tienes que buscar si te pueden poner un préstamo |

Fig. 10B

Table 3B

| Neutral |
|---|
| 如果你想买房子 你得考虑申请贷款 |
| もしあなたが家を買おうとしているのであれば審査に合格するかどうかを研発してみてください |
| Если вы хотите купить дом, вам придется рассмотреть вопрос о получении одобрения на кредит. |
| Si quieres comprar una casa necesitarás buscar un préstamo. |

Fig. 10C

Table 3C

Formal

如果您想购买一间房子，则需要寻求贷款。

マンションの購入をご希望されるならば、融資を受ける際の認可を問うたるべきでしょう。

Для приобретения дома, является необходимым просить о предоставлении кредита.

Si desea adquirir una casa, será necesario consultar la aprobación de un préstamo.

Fig. 11  Table 4

| Target | Translation Quality | Formality |
|---|---|---|
| Informal | 4.14 | 1.30* |
| Neutral | 4.98 | 1.69 |
| Formal | 4.83 | 1.86* |

Fig. 12  Table 5

| Target | tu | usted | Neither |
|---|---|---|---|
| Informal | 96% | 0% | 4% |
| Neutral | 76% | 18% | 6% |
| Formal | 30% | 34% | 36% |

1300

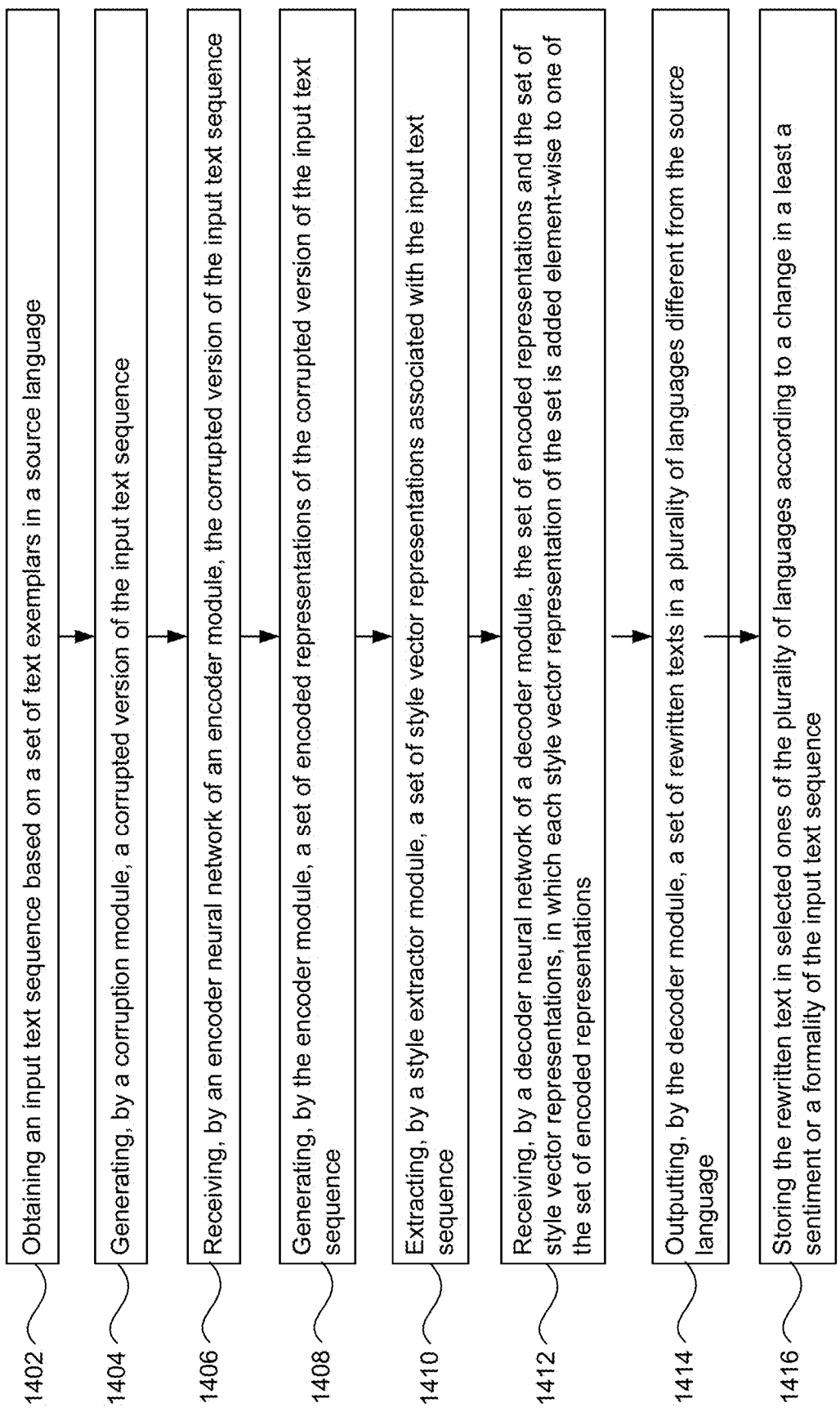

Fig. 14
1400

1402 — Obtaining an input text sequence based on a set of text exemplars in a source language 1404 — Generating, by a corruption module, a corrupted version of the input text sequence 1406 — Receiving, by an encoder neural network of an encoder module, the corrupted version of the input text sequence 1408 — Generating, by the encoder module, a set of encoded representations of the corrupted version of the input text sequence 1410 — Extracting, by a style extractor module, a set of style vector representations associated with the input text sequence 1412 — Receiving, by a decoder neural network of a decoder module, the set of encoded representations and the set of style vector representations, in which each style vector representation of the set is added element-wise to one of the set of encoded representations 1414 — Outputting, by the decoder module, a set of rewritten texts in a plurality of languages different from the source language 1416 — Storing the rewritten text in selected ones of the plurality of languages according to a change in a least a sentiment or a formality of the input text sequence

TECHNIQUES AND MODELS FOR MULTILINGUAL TEXT REWRITING

BACKGROUND

Text translation into different languages is an important area that supports a wide variety of different tools and applications. The quality of results can differ widely depending on the specific languages, models used in translations, and how such models are trained. Certain models may be trained using zero-shot or few-shot approaches in limited translation instances but may not be sufficiently effective in multilingual translations or other text rewriting situations. For instance, it can be challenging to properly convey a particular style or level of formality in translations across various languages. It is also possible for "accidental translations" to occur, in which a model provides a correct answer but in the wrong language. There may also be significant resource tradeoffs between using larger models versus incurring excessive memory costs. These and other issues can adversely affect multilingual translation in conventional approaches.

BRIEF SUMMARY

Aspects of the technology provide a model-based approach for multilingual text rewriting that is applicable across many languages and across different styles that may include various formality levels or other attributes of the text. The approach enables performance of attribute-controlled machine translation (e.g., dialect-aware translation, formality-controlled translations), as well as the ability to adapt text to a given domain or locale. One aspect involves leveraging a large pretrained multilingual model and fine-tuning it to perform general-purpose multilingual attribute transfer.

The techniques and tools described herein establish that few-shot approaches can naturally extend to a multilingual setting. Multilingual models can endow text with additional attributes in one language using exemplars of that attribute from another language, according to a zero-shot style transfer. The model presented is capable of manipulating both language and textual attributes jointly. This approach can support zero-shot formality-sensitive translation, with no labeled data in the target language. There are many computer-based applications in which this technology can be greatly beneficial, including translation services, healthcare apps, video streaming services, videoconferencing, creative writing apps, etc.

According to one aspect, a system is configured for a multilingual text rewriting model. The system comprises memory configured to store a set of text exemplars in a source language and a set of rewritten texts in a plurality of languages different from the source language, and one or more processing elements operatively coupled to the memory. The one or more processing elements implement a multilingual text rewriter as a neural network having a number of modules including: a corruption module configured to generate a corrupted version of an input text sequence based on the set of text exemplars in the source language; an encoder module comprising an encoder neural network configured to receive the corrupted version of the input text sequence and to generate a set of encoded representations of the corrupted version of the input text sequence; a style extractor module configured to extract a set of style vector representations associated with the input text sequence; and a decoder module comprising a decoder neural network configured to receive the set of encoded representations and the set of style vector representations and to output the set of rewritten texts in the plurality of languages. Each style vector representation of the set is added element-wise to one of the set of encoded representations. A set of model weights is shared by the encoder module and the style extractor module, and a unique token is appended to the input text sequence for style extraction instead of mean-pooling all of the style vector representations in the set. The system is configured to provide rewritten text in selected ones of the plurality of languages according to a change in a least a sentiment or a formality of the input text sequence.

In one example, the encoder module, style extractor module and the decoder module are configured as transformer stacks initialized from a common pretrained language model. Alternatively or additionally, both the encoder module and the decoder module are attention-based neural network modules. Alternatively or additionally, the corruption module employs a corruption function C for a given pair of non-overlapping spans (s1, s2) of the input text sequence, so that the model is capable of reconstructing span s2 from C(s2) and Vs1, where Vs1 is an attribute vector of span s1. Here, the corruption function C may be as follow: C:=f(•, source language, –Vs1). Alternatively or additionally, the style extractor module may include a set of style extractor elements including a first subset configured to operate on different style exemplars and a second subset configured to operate on the input text sequence prior to corruption by the corruption module.

During training, the corruption module may be configured to employ at least one of token-level corruption or style-aware back-translation corruption. Alternatively or additionally, the set of model weights may be initialized with the weights of a pretrained text-to-text model. Alternatively or additionally, the model weights for the style extractor module may not be tied to the weights of the encoder module during training.

The system may be configured to extract pairs of random non-overlapping spans of tokens from each line of text in a given text exemplar, and configured to use a first-occurring span in the text as an exemplar of attributes of a second span in the text. Alternatively or additionally, a cross-lingual learning signal can be added to a training objective for training the model. Alternatively or additionally, the encoder module may be configured to use negation of a true exemplar vector associated with the input text sequence as an attribute vector in a forward pass operation. Alternatively or additionally, the decoder module may be configured to receive a set of stochastic tuning ranges that provide conditioning for the decoder module.

In an example, the set of style vector representations corresponds to a set of attributes associated with the input text sequence, and the system is configured to input a set of exemplars illustrating defined attributes and to extract corresponding attribute vectors for use in rewriting the input text sequence into the plurality of languages according to the defined attributes. In this case, the system may be configured to form an attribute delta vector including a scale factor, in which the attribute delta vector is added to the set of encoded representations before processing by the decoder module.

According to another aspect, a computer-implemented method for providing multilingual text rewriting according to a machine learning model is provided. The method comprises: obtaining an input text sequence based on a set of text exemplars in a source language; generating, by a corruption module, a corrupted version of the input text sequence; receiving, by an encoder neural network of an encoder module, the corrupted version of the input text sequence; generating, by the encoder module, a set of encoded representations of the corrupted version of the input text sequence; extracting, by a style extractor module, a set of style vector representations associated with the input text sequence; receiving, by a decoder neural network of a decoder module, the set of encoded representations and the set of style vector representations, in which each style vector representation of the set is added element-wise to one of the set of encoded representations; outputting, by the decoder module, a set of rewritten texts in a plurality of languages different from the source language; and storing the rewritten text in selected ones of the plurality of languages according to a change in a least a sentiment or a formality of the input text sequence. A set of model weights is shared by the encoder module and the style extractor module, and a unique token is appended to the input text sequence for style extraction instead of mean-pooling all of the style vector representations in the set.

In one example, generating the corrupted version of the input text sequence is performed according to a corruption function C for a given pair of non-overlapping spans (s1, s2) of the input text sequence, so that the model is capable of reconstructing span s2 from C(s2) and Vs1, where Vs1 is an attribute vector of span s1. Alternatively or additionally to any of the above, the method further comprising: extracting pairs of random non-overlapping spans of tokens from each line of text in a given text exemplar; and using a first-occurring span in the text as an exemplar of attributes of a second span in the text. Alternatively or additionally, the method further comprises adding a cross-lingual learning signal to a training objective for training the model. Alternatively or additionally, the method further comprises applying a set of stochastic tuning ranges to selectively condition the decoder module. In another example, the set of style vector representations corresponds to a set of attributes associated with the input text sequence. Here, outputting the set of rewritten texts includes generating one or more versions of the input text sequence in selected ones of the plurality of languages according to the set of attributes.

BRIEF DESCRIPTION OF THE DRAWINGS

FIGS. 3A-B illustrates a style extractor architecture for use in accordance with aspects of the technology.

FIG. 4 illustrates a table showing BLEU scores of various supervised and unsupervised models for low-resource language pairs in accordance with aspects of the technology.

FIG. 5 illustrates another table showing examples of a multilingual rewriting model performing sentiment transfer in accordance with aspects of the technology.

FIGS. 6A-B illustrate examples sets of positive and negative exemplars, respectively.

FIGS. 9A-B illustrate formal and informal exemplars for testing aspects of the technology.

FIGS. 10A-C illustrate tables of different levels of formality in accordance with aspects of the technology.

FIG. 11 presents a table showing average formality and translation quality scores for a human evaluation of system operation.

FIG. 12 presents a table showing the T-V distinction accuracy for formality-aware Spanish translations in accordance with aspects of the technology.

FIG. 14 illustrates a method in accordance with aspects of the technology.

DETAILED DESCRIPTION

Overview

The technology provides an encoder-decoder architectural approach with attribute extraction to train rewriter models that can be used in "universal" textual rewriting across many different languages. A cross-lingual learning signal is incorporated into the training approach. Certain training processes do not employ any exemplars. This approach enables not just straight translation, but also the ability to create new sentences with different attributes.

Figure 1:
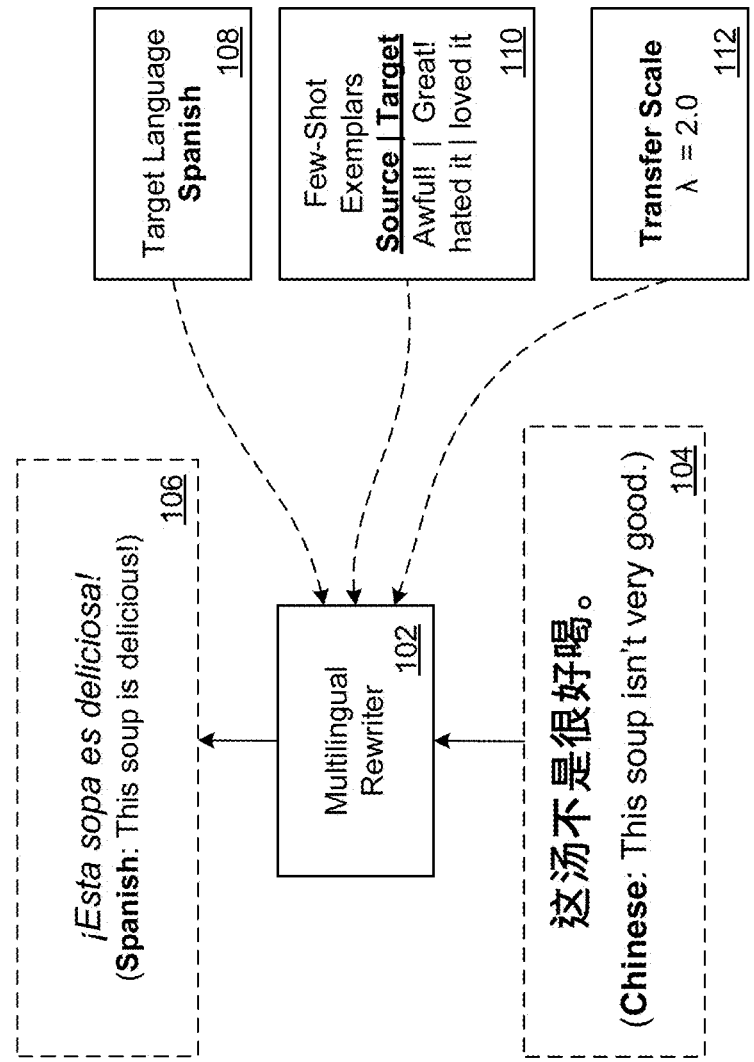
FIG. 1 illustrates an example of rewriting text to exhibit new attributes in accordance with aspects of the technology.

FIG. 1 illustrates a general example 100, which enables rewriting text to exhibit new attributes. For instance, in this example multilingual rewriter module 102 receives an input sentence 102 in Chinese having one type of (negative) sentiment ("This soup isn't very good"). The rewriter module 102 is able to produce an output sentence 104 in Spanish having a different type of (positive) sentiment ("This soup is delicious!"). The model employed by the multilingual rewriter 102 enables rewriting text to exhibit new attributes, such as changes in language, sentiment or formality. Here, the target language (Spanish) 108 is signaled by a unique language code. Other attributes are controlled through few-shot exemplars 110, which may leverage distinct languages from the input and the target. In addition, transfer scale ($\lambda$) 112 modulates the strength of the attribute transfer. The transfer scale helps control how much preference the model can give to the desired style versus preserving the input. At one extreme, a very large scale would lead to the model completely ignoring the input and producing a random sentence in the target style. However, control of this parameter can enable the system to attain all values in the spectrum of a given style. For example, for the sentence "The movie was okay", if there is a goal for a more positive sentence, once could potentially attain "The movie was good", "The movie was great", and "The movie was amazing!" by using larger and large transfer scales.

Aspects of the technology are used to test the conjecture that large models trained on massive multilingual corpora should be able to "identify" a textual attribute (e.g., formality) given just a few exemplars in one language (e.g., English), and "apply" the underlying concept to a generative task in another language in a zero-shot fashion (e.g., formality transfer in Chinese). This can be tested by leveraging a large pretrained multilingual model and fine-tuning it to perform general-purpose multilingual attribute transfer.

Note that in the following discussion, the terms "attributes" and "styles" are used interchangeably. The model can go beyond traditional tasks associated with style transfer, for example extending to translation (language transfer) and style-conditioned translation. The term "exemplars" is used to denote inputs show-casing a particular attribute.

General Approach

Figure 2:
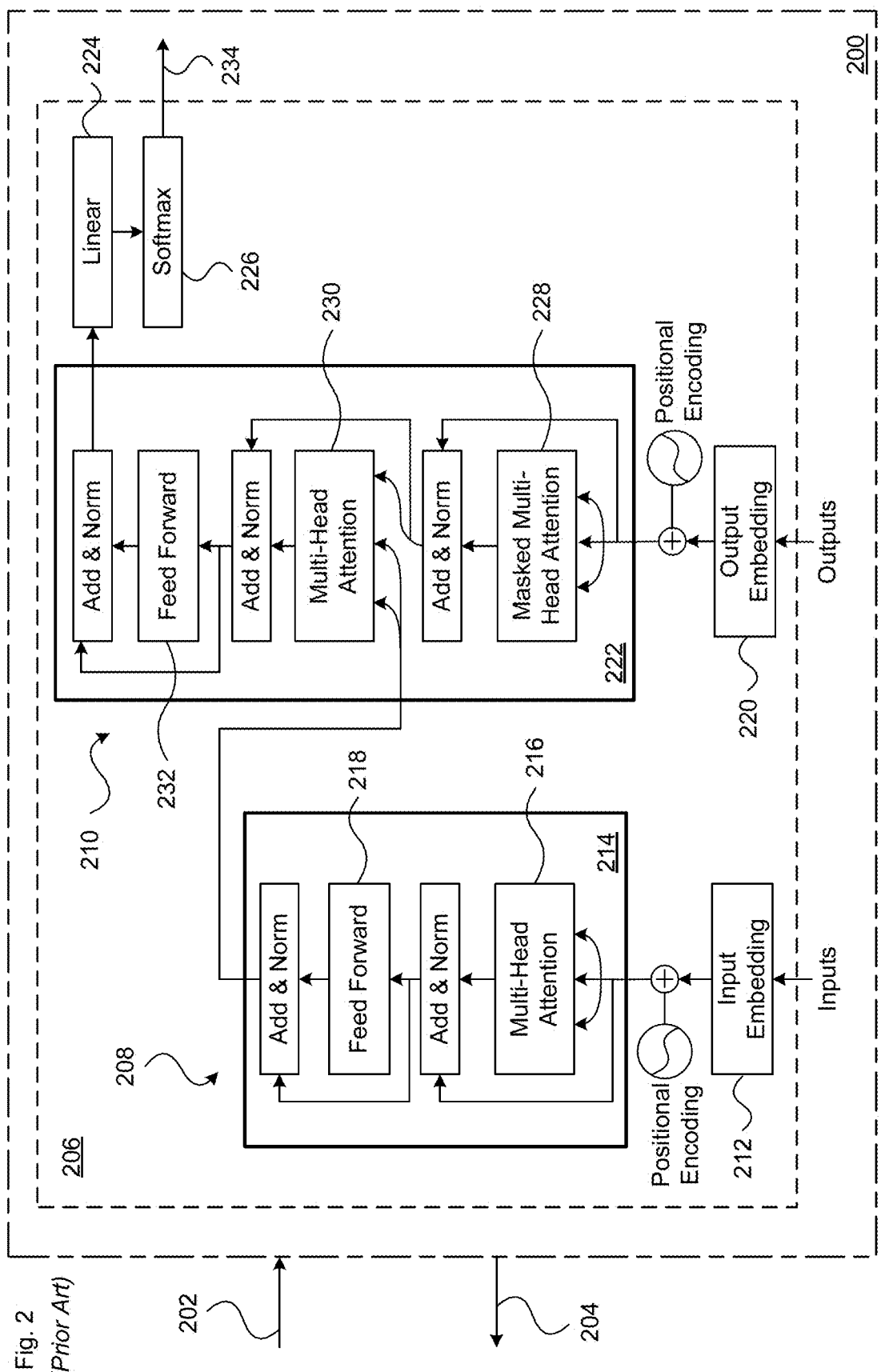
FIG. 2 illustrates a Transformer-type architecture for use in accordance with aspects of the technology.

The machine translation rewrite model discussed herein may employ a neural network such as a convolutional neural network (CNN) or a recurrent neural network (RNN), e.g., a bidirectional long short-term memory (Bi-LSTM) RNN. Alternatively or additionally, the model may employ a self-attention architecture. This may include an approach such as the Transformer neural network encoder-decoder architecture. An exemplary Transformer-type architecture is shown in FIG. 2, which is based on the arrangement shown in U.S. Pat. No. 10,452,978, entitled "Attention-based sequence transduction neural networks", the entire disclosure of which is incorporated herein by reference.

System 200 of FIG. 2 is implementable as computer programs by processors of one or more computers in one or more locations. The system 200 receives an input sequence 202 and processes the input sequence 202 to transduce the input sequence 202 into an output sequence 204. The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. Generally, an encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output. These two layers being inserted after each of the two sub-layers, both referred to as an "Add & Norm" operation.

Some or all of the decoder subnetwork 170 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution.

One baseline configuration that can be employed with aspects of the technology employs an English-language few-shot style transfer model encoder decoder Transformer, which is equipped with an additional "style extractor" that is a variation of the encoder neural network 208 discussed above. This configuration removes the need for training labels, and offers a single model that can target an unrestricted set of style attributes. Aspects of this approach are discussed in detail in "TextSETTR: Few-Shot Text Style Extraction and Tunable Targeted Restyling", by Riley et al., Proceedings of the 59th Annual Meeting of the Association for Computational Linguistics and the 11th International Joint Conference on Natural Language Processing, © 2021, the entire disclosure of which is incorporated herein by reference.

Figure 3B:
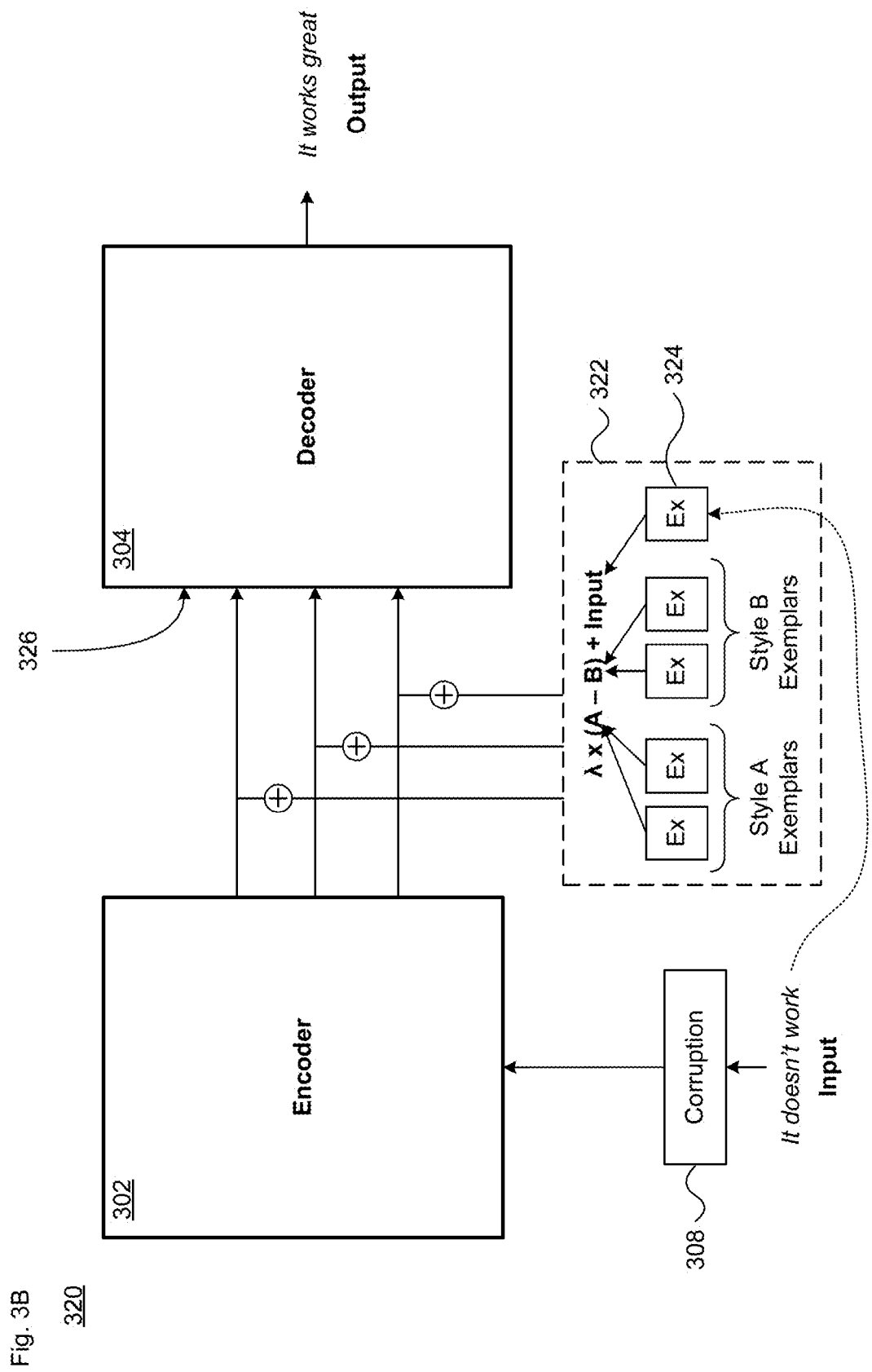

Here, the style extractor takes exemplars of a style as input and extracts a fixed-width "style vector" by mean-pooling the output embeddings across tokens. These style vectors (and combinations thereof) can then be added element-wise to the encoded representations of a given input before being passed to the decoder in order to induce targeted style changes. FIG. 3A illustrates an example training configuration 300, and FIG. 3B illustrates an example inference configuration 320.

The training configuration 300 shows an architecture for few-shot style transfer. Encoder 302, decoder 304 and style extractor 306 are transformer stacks initialized from a pretrained language model such as T5, which is trained using teacher forcing. During training, the model reconstructs a corrupted input provided by corruption block 308, conditioned on a fixed-width "style vector" extracted from the preceding sentence. The corruption block 308 may employ two types of corruption: token-level and style-aware back-translation. In the former, a noise function is applied independently to each token, with a probability of either dropping a token, replacing it with one of the examples in the current batch at the same position or keeping it as is. In the latter, the model is used in inference mode to change the style of the input to match the style of a random sentence in the batch, and the resulting output is used as a corrupted version of the input. The corruption block 308 corrupts the input by (i) dropping, (ii) replacing, and/or (iii) shuffling tokens, which may be performed in that order. The training occurs in an unsupervised fashion, so the model can handle arbitrary styles at inference time. To compensate for the lack of training labels, this architecture relies on the intuition that style is a "slow-moving feature", consistent across long spans of text.

One or more stochastic tuning ranges 310 can be used to provide extra conditioning for the decoder 304, and enable fine-grained control of inference. This can include different "add" and "delete" rates. By way of example, for every input/output pair during training, the system can calculate the proportions of tokens that were added and deleted. The "add rate" is the proportion of output tokens absent from the input, and the "delete rate" is the proportion of input tokens absent from the output. These rates can be provided to the decoder as ranges covering but not necessarily centered on the "true" rates. For instance, each range width may be sampled uniformly from [0,1], and uniformly sample the "alignment" of the true rate within the range. In this approach, the final ranges are clipped to [0,1], and a vector containing the upper and lower bound of each range is prepended to the encoder hidden state sequence. This approach provides more flexibility at inference time, so the system can enforce tight or loose constraints on each rate.

To incorporate the style vector into the rest of the model, it is added to each of the final encoder hidden states. The weights of the model may be initialized with those of a pretrained (e.g., T5) model. Both the style extractor and the encoder can be initialized from the pretrained encoder, but the weights need not be tied during training.

As shown in the example inference configuration 320 of FIG. 3B, style extractor block 322 has a set of style extractor elements 324, which may operate on different style exemplars (e.g., styles "A" and "B"), and also on the input prior to corruption. $\lambda$ is the delta scale, which can be an important hyperparameter to tune. It has been found that values in the range [1.0, 10.0] work well, with the best values depending on the attribute and the exemplars in question. Stochastic tuning ranges 326 may be the same or different from those used during training. With this approach, at inference time a new style vector is formed via "targeted restyling", which adds a directional delta to the extracted style of the input text.

Multilingual Approach

In order to make the model robust and applicable to "universal" text rewriting, one aspect of the technology includes not separating the attribute extraction module (e.g., style extractor 306 in FIG. 3A) from the encoder-decoder architecture. Instead, all the weights are shared between this module and the encoder. In order to distinguish the two, the system prepends the text with a unique token when performing attribute extraction, and takes the representation of this token from the encoder's output as the fixed-width vector representation, instead of mean-pooling all the representations. This allows the multilingual architecture to leverage larger models without incurring excessive memory costs.

While one approach that is focused on a particular language employs a sentence-splitting algorithm that is based on detecting English punctuation, it has been found that such an approach can lead to problems for some languages. In particular, sentence-splitting during preprocessing of non-English text may discard any data that does not include ASCII punctuation. For languages like Chinese and Thai, which do not typically use ASCII punctuation, this would filter out most well-formed text, leaving mainly text in the wrong language, or a non-natural language (e.g., Javascript code). This could adversely affect system operation, so a more language-agnostic approach has been adopted. Here, the system extracts pairs of random non-overlapping spans of tokens from each line of text, and uses the first-occurring span in the text as an exemplar of the attributes of the second span. This approach allows the system to retain all data, is independent of language, and still exploits the "slow-moving feature" intuition discussed above.

In one scenario, the system starts with an mT5 checkpoint as the initial model, for instance the XL variant. While it is possible to use style-aware back-translation, according to one aspect of the technology an additional cross-lingual learning signal is added to the training objective by forcing the model to not only perform an attribute transfer procedure but also to translate the sentence to a baseline language such as English. English is particularly suitable due to the availability of parallel data between English and many other languages. To make this objective more similar to the cycle-consistency found in traditional back-translation, the system can use the negation of the "true" exemplar vector associated with the input (as opposed to leveraging a random exemplar) as the attribute vector in the forward pass. More explicitly, let f be the function which takes a triplet of (text, language, attribute vector), then proceed to pass the text through the encoder, add the attribute vector element-wise to the encoded representations, then decodes the result into the given language through sampling. For a given pair $(s_1, s_2)$ of non-overlapping spans, one can define the corruption function C as follow:

$$C:=f(\bullet, \text{English}, -V_{s1})$$

where $V_{s1}$ is the attribute vector of the first span, and the model is tasked with reconstructing $s_2$ from $C(s_2)$ and $V_{s1}$. The intuition behind the negative exemplar is that it is desirable for the model to learn that the changes induced by an attribute vector should be undone when applying the same procedure with the negative of this attribute vector. Note that the system can perform the decoding operation using sampling, e.g., with a temperature of 1.5.

In addition to the cross-lingual treatment of the style-aware back-translation objective, the approach also includes translation as another cross-lingual learning objective by leveraging English-centric translation data for some language pairs. For this task, exemplars are not used.

There are multiple ways one could use the attribute vectors to perform rewriting. Suppose the system is provided with sets of exemplars illustrating attributes A and B, which are used to extract attribute vectors $V_A$ and $V_B$, respectively. Given an input x with attribute A, the system should rewrite it to exhibit attribute B. One inference strategy is to first extract the attribute vector $V_x$ of x, then form the following attribute delta vector:

$$V_{A,B,x}:=V_x+\lambda(V_B-V_A)$$

In this case, $\lambda$ is a scale factor, which may be chosen by the user. The resulting vector $V_{A,B,x}$ then gets added to the encoded representation of x before being passed to the decoder. For within-language tasks, where the output should be in the same language as the input, the system can use this inference strategy.

However, in certain cross-language experiments, it was found the model was more reluctant to change languages when using this strategy. For this reason, according to one aspect of the technology the system does not include the vector $V_x$ in the computation of $V_{A,B,x}$ for cross-language tasks, and instead uses the following equation:

$$V_{A,B,x}:=\lambda(V_B-V_A)$$

Experimental Setup

This section describes certain experiments using the multilingual architecture. First is a discussion of the selection of languages and data sources considered, as well as data preprocessing steps. Next, the performance of the models is measured in the challenging tasks of low-resource and unsupervised machine translation which is viewed as rewriting text in a different language. After this experiment, a multilingual variant of the sentiment transfer task is introduced, which allows for exploration of the interaction between multilinguality and style transfer. Finally, consider the problem of multiple attribute rewriting through two cross-lingual sentence rewriting tasks and zero-shot formality-aware machine translation task for the specific language pair English-Spanish.

Data

According to the experimental setup, the system drew monolingual data from mC4, the same dataset used to train mT5. The "-Latin" languages were removed due to their small data size. Parallel data for 46 of these languages with English was leveraged, by taking all language pairs with more than 500,000 lines of parallel data from the OPUS 100 (dataset, with the exception of Hebrew, Croatian, Bosnian (because their language codes in OPUS 100 were not present in the language codes of mC4), and Japanese. Japanese was excluded as it appears in the sentiment evaluation, and it was desirable to test the model's ability to perform zero-shot attribute transfer in languages where no parallel data is available. As Japanese has a unique script and no genealogical relation with other languages under consideration, it poses a particularly challenging case. The two-character language codes for the utilized languages are as follows: ar, bg, bn, ca, cs, da, de, el, es, et, eu, fa, fi, fr, gl, hi, hu, id, is, it, ko, lt, lv, mg, ink, ml, ms, mt, nl, no, pl, pt, ro, ru, si, sk, sl, sq, sr, sv, th, tr, uk, ur, vi, and zh.

Data Sampling Scheme

Both parallel and monolingual datasets were used for training the rewriter models. For each batch, a random selection was made to select to sample from either the monolingual or parallel datasets (with equal likelihood), and then uniformly sample from all available datasets in the chosen category.

Preprocessing

The monolingual data was preprocessed into input-exemplar pairs, using the approach described above. In addition, any pair was discarded where either element is shorter than five tokens. In the case of parallel data, no exemplars were leveraged, and instead used a vector of zeros. For both data sources, any training example with either input, exemplar or target (in the case of parallel data) longer than 64 tokens was discarded. Language-specific tokens were pre-pended to the input to prime the model for translations. Instead of introducing new tokens, the tokens associated to the target language names in English were reused.

Training Hyperparameters and Settings

The models were trained in JAX (discussed in "JAX: composable transformations of Python+NumPy programs" by Bradbury et al., 2018). The Adafactor optimizer was used (discussed in "Adafactor: Adaptive learning rates with sublinear memory cost", in Proceedings of the 35th International Conference on Machine Learning, volume 80 of Proceedings of Machine Learning Research, pages 4596-4604). The accumulated optimizer states were reused from the original mT5 training. A constant learning rate of 1e-3 was used and trained for 25,000 steps, using batches of 512 inputs. Both the Jax and Adafactor references are incorporated herein by reference.

Evaluation

For machine translation, the system utilized BLEU scores (as discussed in "Bleu: a method for automatic evaluation of machine translation", 2002, in Proceedings of the 40th Annual Meeting of the Association for Computational Linguistics, pages 311-318). The scores were computed through the sacreBLEU5 library (see "A call for clarity in reporting BLEU scores", 2018, in Proceedings of the Third Conference on Machine Translation: Research Papers, pages 186-191). The output was tokenized for the Indic languages using the tokenizer provided by the Indic-NLP library (see "Indic NLP Library, A unified approach to NLP for Indian languages by Anoop Kunchukuttan, 2020). For decoding, a beam search was used, with a beam size of 5 for machine translation, within-language sentiment transfer and formality-aware machine translation, and beam size of 1 for cross-language sentiment transfer. Each of the identified references is incorporated herein by reference.

Baselines

Aspects of the technology introduce several baselines, which follow a similar training recipe as the general rewriter model discussed herein, but with some features removed. The baselines include no parallel data (-para); no language tokens (-lang tokens); no exemplars in training (-exemplars); and no back-translation (-BT). The "-para" setting tests whether the additional supervision signal obtained from the parallel data is necessary or even useful, and the "-lang tokens" setting addresses a similar question regarding language tokens. The "-exemplars" setting tests whether we suffer any degradation in translation quality by introducing the ability to leverage exemplars at inference time. Finally, given the expensive nature of back-translation, the "-BT" setting tests whether this objective is truly necessary.

Machine Translation for Low-Resource Languages

Parallel data only accounts for a fraction of the languages available in mC4, yet there is interest in rewriting across all languages in mC4, potentially changing languages and attributes at the same time. To ensure the model is capable of such cross-lingual tasks, the translation quality is inspected on a selection of low-resource languages. Aspects of the technology study both languages with parallel data as well as those without it, a setting referred to as "unsupervised machine translation by language transfer" or "multilingual unsupervised machine translation". In the latter setting, there is a consideration of the translation quality for low-resource English-centric pairs where the associated low-resource languages have no parallel data at all, with English or otherwise.

According to one set of tests, Turkish, Gujarati, and Kazakh were selected as low-resource languages, using the available newstest test sets from WMT, using newstest2018 for Turkish and newstest2019 for Gujarati and Kazakh. Of these three languages, in one example the model only sees parallel data for the language pair English-Turkish. FIG. 4 illustrates Table 1, which presents BLEU scores of various supervised and unsupervised models for low-resource language pairs.

Table 1 compares the instant Universal Rewriter model with the bilingual unsupervised translation models and large multilingual unsupervised translation models of certain prior approaches and their analogous supervised variants. To control the output language in the baseline with no language tokens, during testing the system leveraged 214 (16,384) examples of monolingual data for each language with $\lambda=0.5$, chosen from $\{0.5, 1.0, 1.5\}$ by looking at devset performance. For testing, this data was randomly drawn from the newscrawl datasets.

Notably, the rewriter model attains comparable performance with the external baselines, despite not being directly trained for unsupervised translation. It is interesting to note that the baseline with no parallel data collapses, failing to produce the correct language and giving low BLEU scores. A similar pattern for the baseline is seen without language tokens (-lang tokens) when translating into languages without parallel data. On the other hand, the remaining baselines that leverage parallel data manage to attain reasonable scores (even for language pairs without parallel data), justifying the inclusion of the parallel data. Finally, it is observed that removing the ability to control text attributes via exemplars (-exemplars) confers no meaningful benefit for translation quality. This finding supports the view that a single general model can be well-suited to adjust both language and other textual attributes.

Zero-Shot Sentiment Transfer

Next, turning to style transfer in a multilingual setting, it is demonstrated for the first time the possibility of performing attribute transfer in one language using only exemplars from another language. Specifically, it is observed that Universal Rewriter model discussed herein can transfer sentiment in French, German and Japanese (as shown in Table 2 of FIG. 5), despite having seen no sentiment labels in those languages, only four sentiment-labeled in English, and no labeled data whatsoever in Japanese. Here, for this test the system used $\lambda=5.0$, and defined sentiment using just four English exemplars: {I loved it./The movie was great./I hated it./The movie was awful.}

It is noted that previous work on multilingual style transfer has been limited to a less ambitious setting where (i) models are trained for transferring one specific attribute, (ii) a large corpus of labels is provided at training time, and (iii) the labels cover all target languages. By contrast, the current approach is attribute-agnostic (one model can transfer arbitrary attributes), few-shot (only using labels at inference time), and zero-shot across languages.

A specific multilingual style transfer evaluation was developed for testing, crafted from an existing dataset for multilingual classification. In particular, this evaluation leverages the multilingual Amazon reviews dataset, which was presented by Prettenhofer and Stein. In "Cross-language text classification using structural correspondence learning", 2010, in Proceedings of the 48th Annual Meeting of the Association for Computational Linguistics, pages 1118-1127 (incorporated herein by reference). This dataset consists of Amazon reviews in English, French, German and Japanese with review ratings in the range 1-5. For testing, the approach treated reviews rated 4 or 5 as positive, and reviews rated 1 or 2 as negative, and dropped reviews rated 3. mBERT was fine-tuned (the multilingual variant of BERT) on the remaining reviews and treated it as an oracle sentiment classifier, splitting the reviews into training and development sets. This model achieved 80.1% accuracy on this development set.

The Universal Rewriter model was compared with various ablation models on the task of transferring negative to positive sentiment. For evaluation, examples longer than 61 tokens were removed, samples were disregarded that disagreed with the oracle classifier, only keeping those which it assigned above 80% probability of being the correct class. Prepending two tokens to every example was done to control the language, and one end-of-sentence token. This gave a maximum of 64 tokens, which is the maximum length that the models were trained on. Development and test sets were constructed from the remaining examples, consisting of 800 examples, 200 from each language, equally balanced in positive and negative reviews.

For this experiment, there were three questions of interest: (1) Are English exemplars sufficient to perform sentiment transfer in non-English languages? (2) Is the Universal Rewriter model able to simultaneously transfer sentiment and language (multiple attribute rewriting? And (3) Is the use of parallel data necessary to achieve either of the above goals? To study the first question, the system leverage twenty (total) handcrafted English exemplars, exhibiting positive and negative sentiment for all experiments. FIGS. 6A and 6B illustrate the sets of positive and negative exemplars, respectively.

Figure 7:
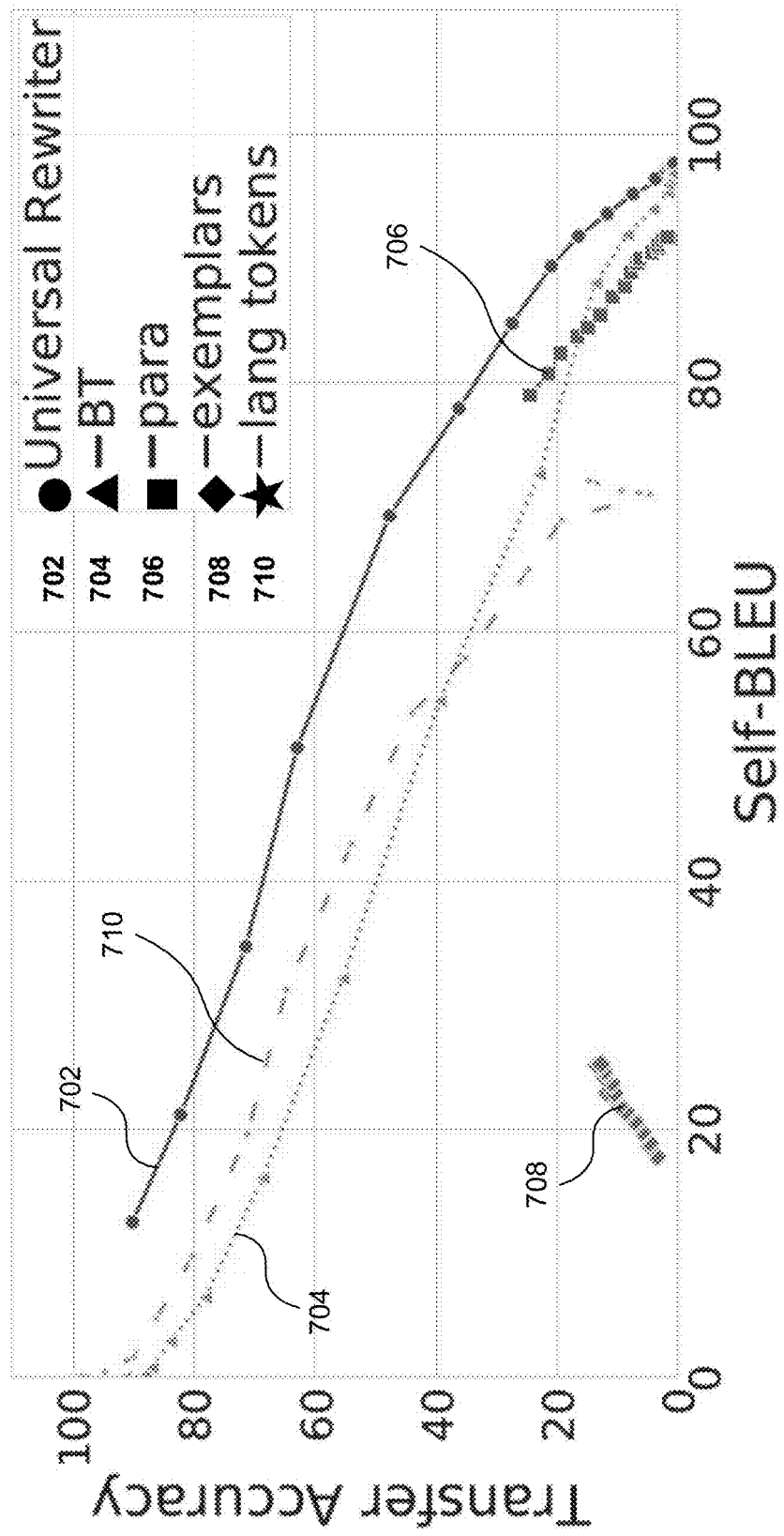
FIG. 7 illustrates how model behavior can depend on the inference-time parameter.

To address the third question, the testing purposely excluded English-Japanese parallel data. Given Japanese's unique script, it was believed performance on Japanese sentiment transfer and translation is a reasonable proxy for the low-resource languages within mC4 for which there may be difficulties obtaining parallel data. Since model behavior depends on the inference-time parameter $\lambda$, results are shown in chart 700 of FIG. 7 for a wide array of $\lambda$ values (sweeping from 0.5 to 9.0 in increments of 0.5) to examine the influence of this parameter. For this task, the following two metrics were used: (i) self-BLEU, defined as the BLEU score using the inputs as references and the model's outputs as hypotheses, and (ii) transfer accuracy, defined as the average sentiment transfer accuracy as judged by our classifier. As shown in FIG. 7, the $\lambda$ parameter allows control of the content preservation vs. transfer accuracy trade-off, accurately changing attributes while still preserving content and language. Note that the general shape of the baseline without language tokens (-lang tokens) 710 is similar to Universal Rewriter 702, only shifted to the left. Upon inspection, it was found this to be due to wrong-language errors, which negatively affected the self-BLEU score.

Cross-Lingual Sentiment Transfer

Whether the model is capable of rewriting multiple attributes in one pass can be evaluated by assessing its ability to perform sentiment transfer and translation simultaneously. For such testing, the same exemplars, development and test sets were reused as in the previous experiment. Here, instead of simply transferring sentiment, the system also varies the target language to produce translations into each other language. In this cross-lingual setting, defining content preservation is more challenging, since self-BLEU is no longer a meaningful measure as the input and target could be of potentially very different languages. Given the strong performance of the universal rewriter model on translation as shown above, "neutral" translations were generated using $\lambda=0$ and treating those as gold labels. Then self-BLEU was redefined to be the BLEU score computed using these predictions as references. As $\lambda$ increases one can expect to see more changes relative to the neutral translations, but also an increase in transfer accuracy.

Three levels of supervision were considered: (1) unsupervised translation for the language pairs Japanese↔{English, French, German}, (2) zero-shot translation for the language pairs French↔German, which lack parallel data but both languages have parallel data with English, and (3) supervised translation for the language pairs {French, German}↔English, which have parallel data. Note that for the zero-shot (and some of the unsupervised) pairs, exemplars are in a different language from both the input and output, which acts as an additional test of the cross-linguality of the model.

Figure 8B:
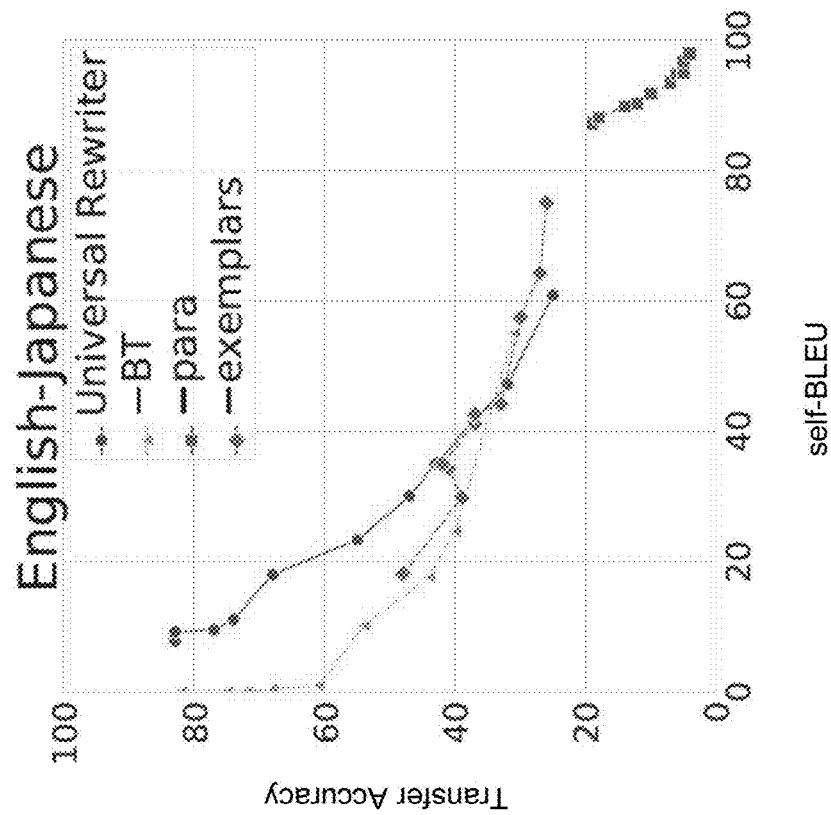
FIGS. 8A-L measure content preservation versus transfer accuracy as both language and sentiment are changed at the same time, in accordance with aspects of the technology.
Figure 8A:
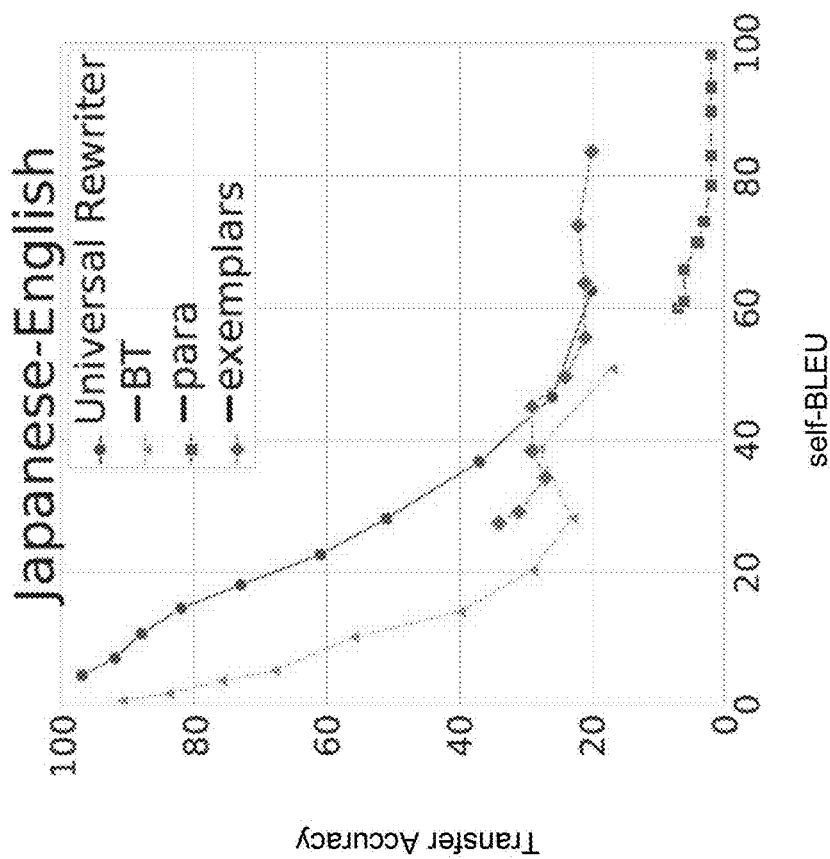
Figure 8D:
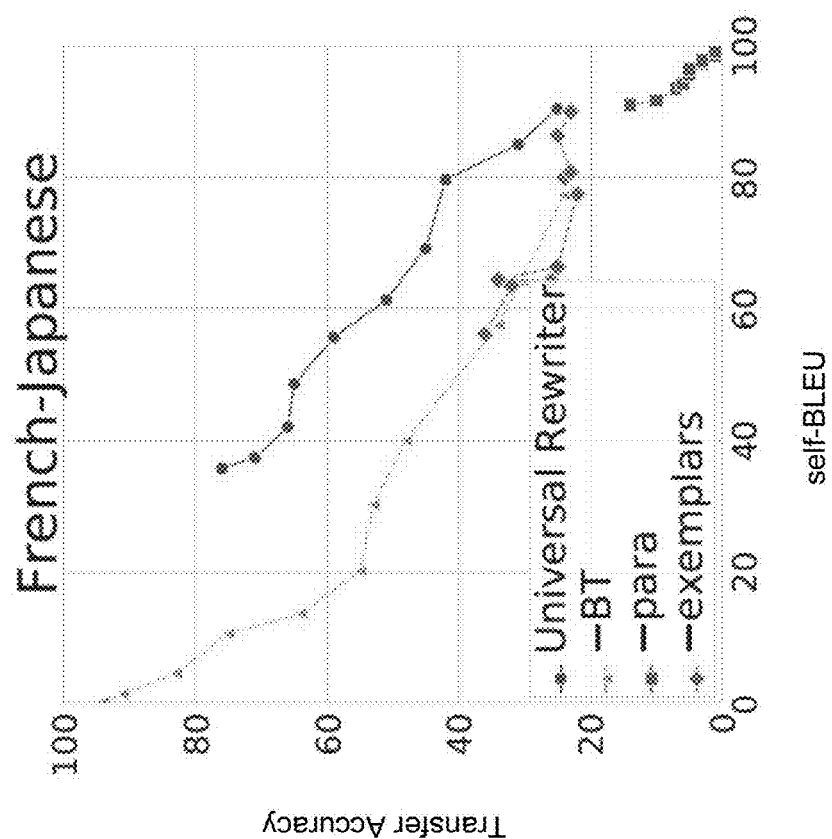
Figure 8C:
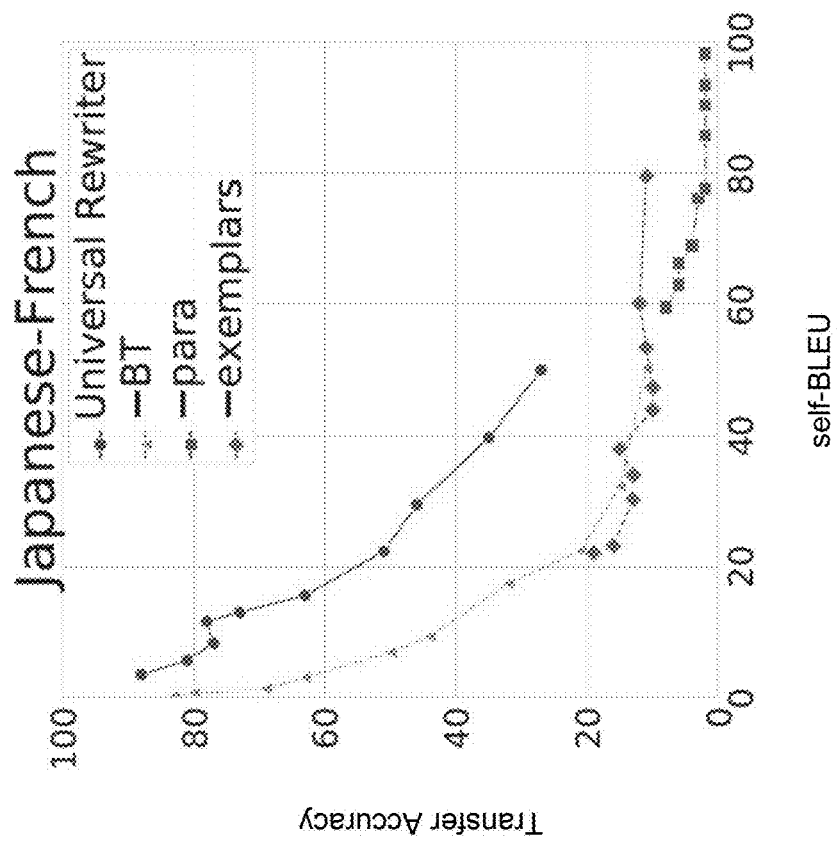
Figure 8F:
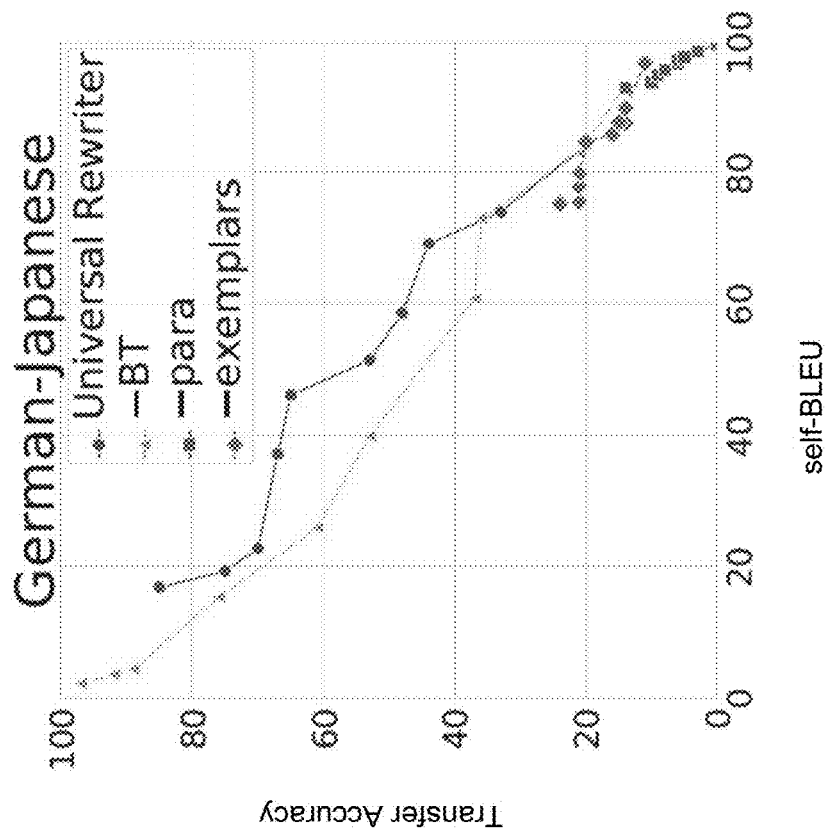
Figure 8E:
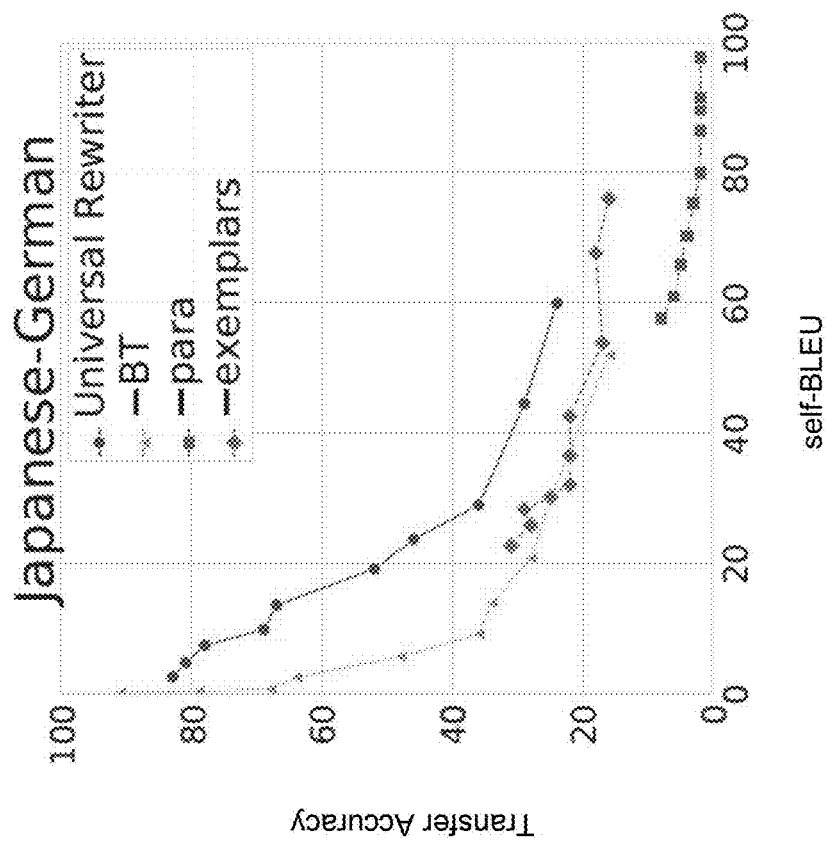
Figure 8H:
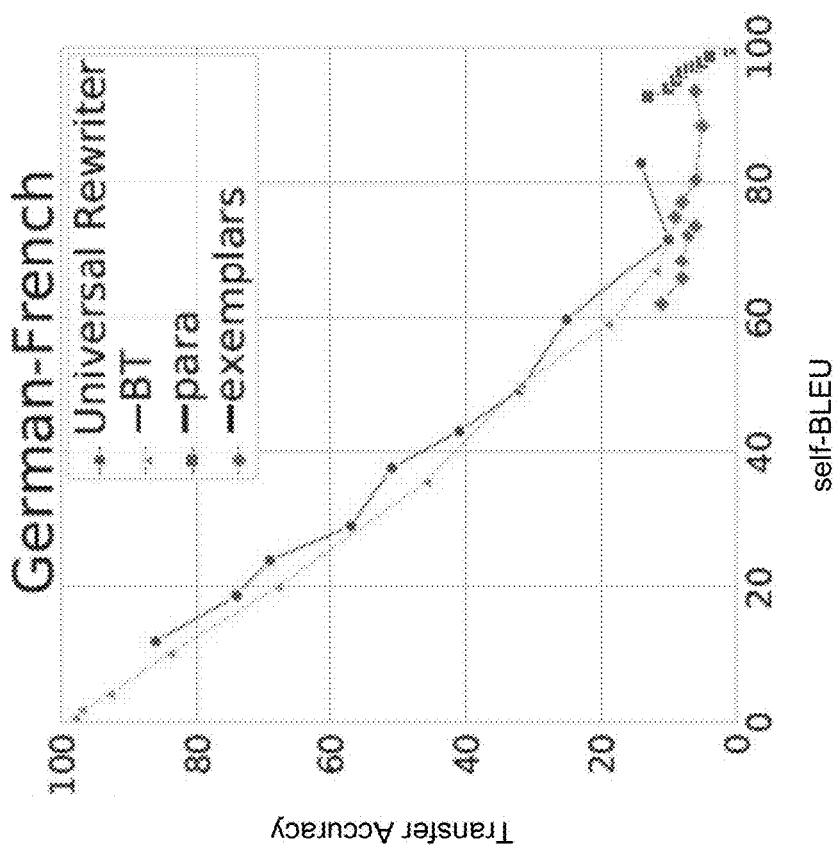
Figure 8G:
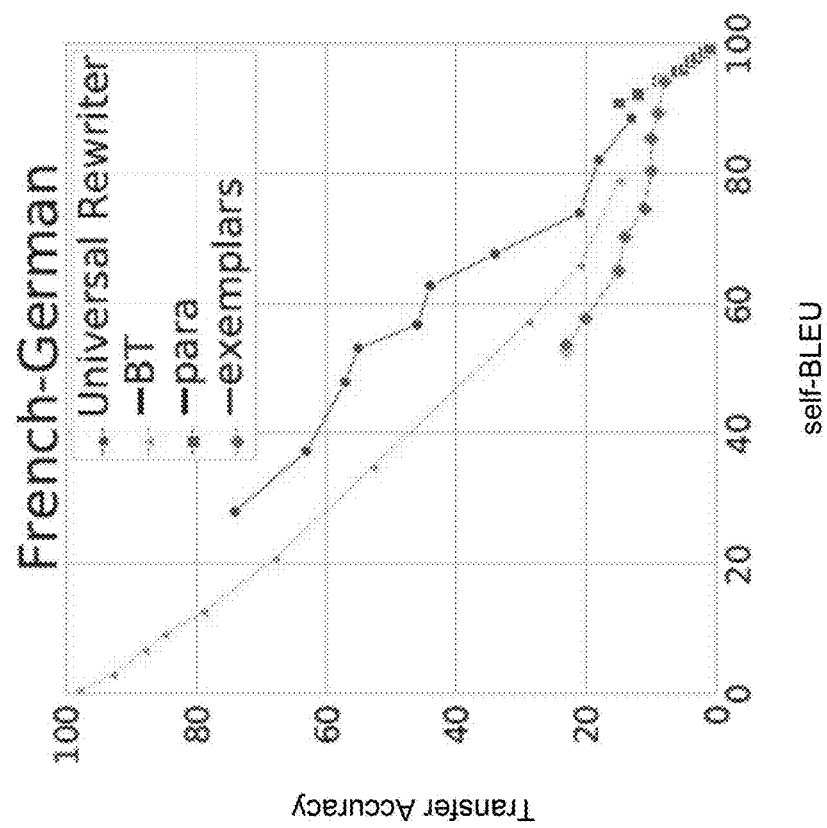
Figure 8J:
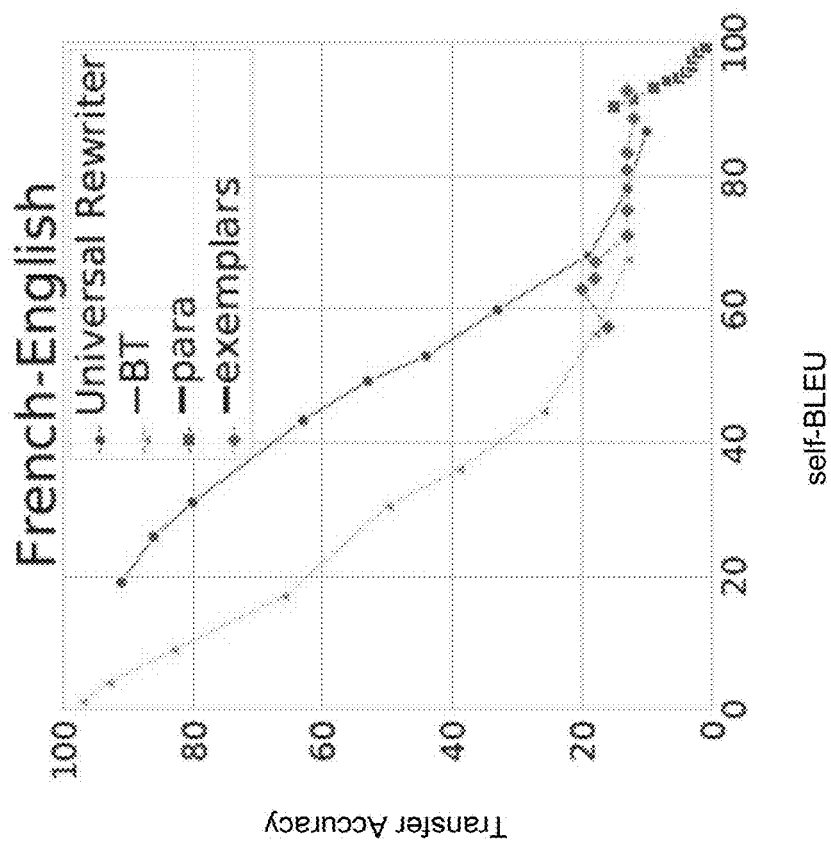
Figure 8I:
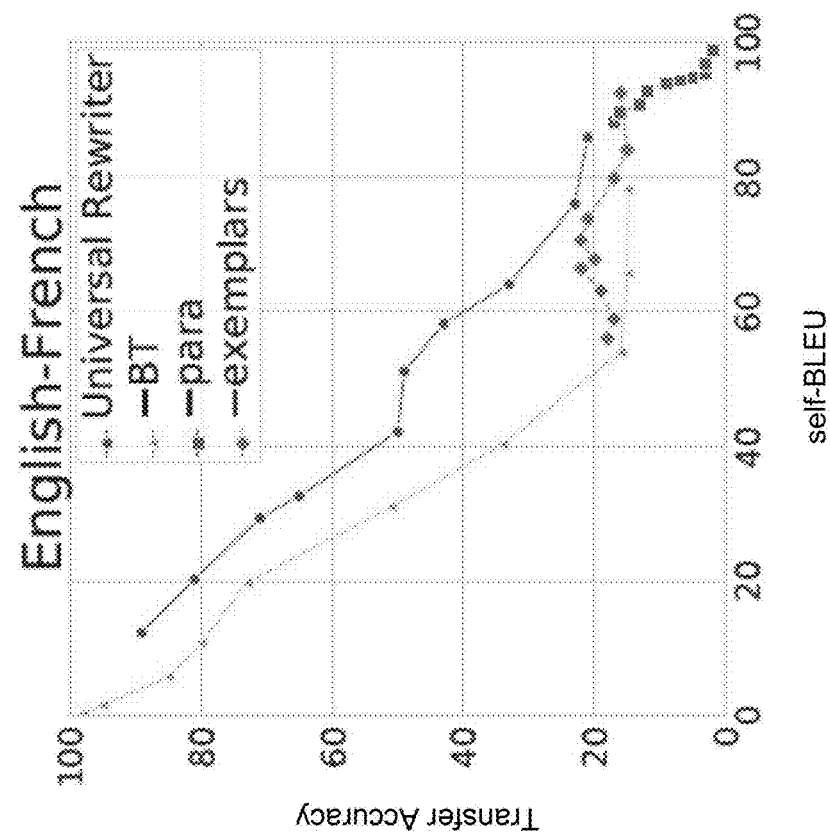
Figure 8K:
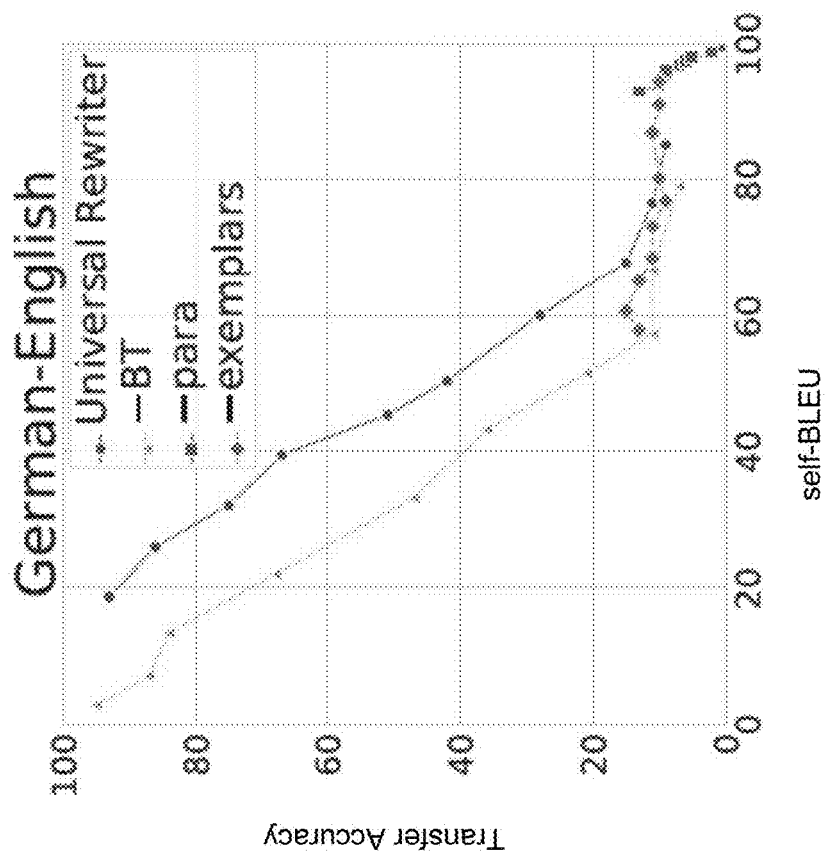
Figure 8L:
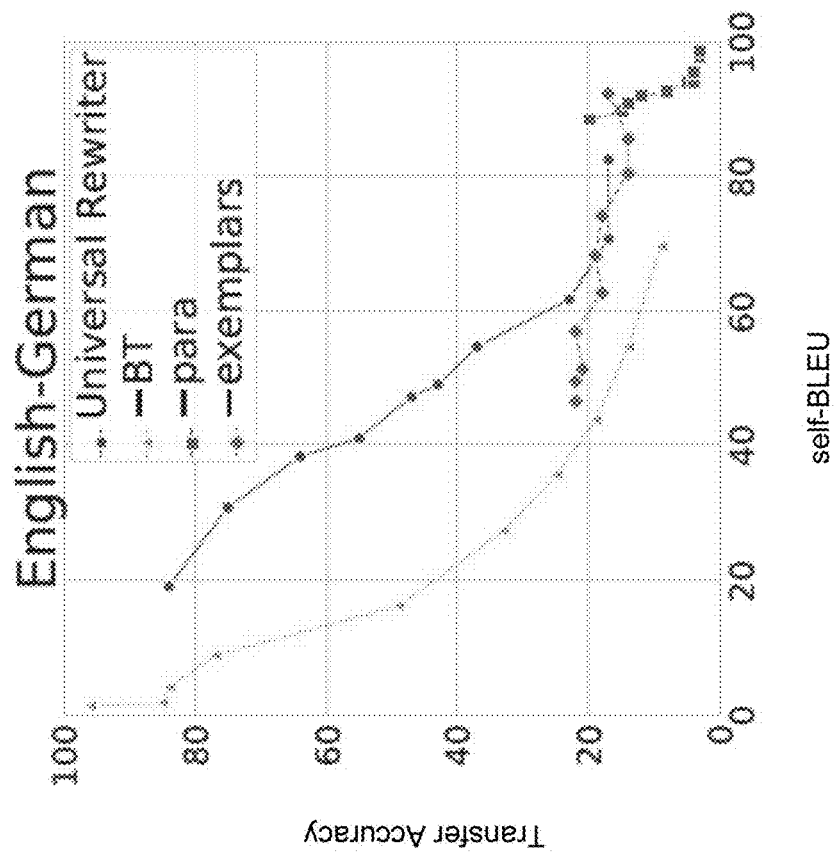

FIGS. 8A-L measure content preservation vs. transfer accuracy as both language and sentiment are changed at the same time. For this task, $\lambda$ was varied between 0.5 and 5.0 with 0.5 increments. The "-lang tokens" baseline was omitted since there was no explicit way of controlling both language and style for this baseline. As in the within-language case, the Universal Rewriter outperformed all the ablations, as presented in the various results in FIGS. 8A-L. Here, FIGS. 8A-F show plots of different unsupervised language pairings, comparing transfer accuracy (Y axis) to self-BLEU values (X axis). FIGS. 8G-H show zero-shot language pairs, evaluating transfer accuracy (Y axis) to self-BLEU values (X axis). And FIGS. 8I-L show supervised language pairs, again evaluating transfer accuracy (Y axis) to self-BLEU values (X axis).

Formality-Sensitive Translation

As a more practical test of the model's ability to transfer multiple attributes in one pass, formality-sensitive translation can also be evaluated. Such a task requires the model to translate input text into another language, while simultaneously controlling the formality level of the output text. This type of control is useful when the desired formality level is known ahead of time, and may not match that of the source text—for example, when providing translations for second language learners, or for use within an assistive agent.

For this test, assume labels are only available in English, and in limited quantity. Specifically, 10 English exemplars were constructed (total) of formal and informal language, as shown in FIGS. 9A and 9B, respectively.

Tables 3A-C of FIGS. 10A-C show a successful example of Universal Rewriter translating an input sentence into four languages at three levels of formality. Table 3A of FIG. 10A is an informal level, table 3B of FIG. 10B is a neutral amount of formality. And table 3C of FIG. 10C is a more formal level. Native speaker consultants confirmed that, while not every translation is perfectly natural, they are all understandable, and the formality level clearly increases going from informal to neutral to formal. Interestingly, these differences manifest in both lexical and grammatical choices, including the use of formal vs. informal pronouns in Chinese, Russian and Spanish, despite this distinction being absent in English.

Human Evaluation

For a more thorough examination, focus on the language pair English-Spanish. Here, in one test 50 sentences were first randomly sampled (in which sentences containing toxic words or ungrammatical text, as well as those longer than 64 tokens or shorter than 3 tokens were manually removed), containing 2nd person pronouns from the English NewsCrawl datasets. Next, informal, neutral, and formal translations were generated of these 50 sentences, yielding a total of 150 sentences. Then bilingual speakers were asked to assess the formality and quality of the translations. Speakers rated formality on a scale of 0-4 (using the labels: Very informal, Informal, Neutral, Formal, and Very formal), and the quality on a scale of 0-6 (with the labels: No meaning preserved, Some meaning preserved, Most meaning preserved and few grammar mistakes, and Perfect meaning and grammar for the values 0, 2, 4, and 6 respectively).

To encourage high-quality translations, beam search was used with a beam size of 5. $\lambda=2:3$, 0, and 1.5 to generate the informal, neutral, and formal translations respectively. Items with an asterisk are statistically significantly different from the analogous result for the neutral. The average formality and translation quality scores are presented in Table 4 of FIG. 11, showing the resultant human evaluations for zero-shot formality-aware machine translation according to the universal rewriting model described above.

It can be seen that on average, the universal rewriting model is successful in increasing perceived formality when moving from informal to neutral to formal translations. While the formal and informal outputs exhibit a slight degradation in translation quality (as compared to neutral outputs), on average raters still judge that most of the meaning of the input is preserved. Given the relatively small number of sentences used in this experiment (3 sets of 50 translations), statistical significance tests performed using paired bootstrap resampling (as described by Philipp Koehn (2004) in "Statistical significance tests for machine translation evaluation. In Proceedings of the 2004 Conference on Empirical Methods in Natural Language Processing), pages 388-395, incorporated herein by reference) with 1000 bootstrapped datasets. The average formality scores for the informal (resp. formal) translations were verified as being lower (resp. higher) than the scores associated with the neutral translations with at least 95% statistical significance. Here, "resp. lower" or "resp. higher" mean that the formality scores for the stylized-translations were either higher (when making them formal) or lower (when making them informal) than the base translation. This demonstrates that the model is able to control the formality of the generated text.

Evaluating Formality Through the T-V Distinction

An additional evaluation of formality was performed by assessing whether the model successfully uses the T-V distinction in Spanish to convey formality (described by Brown and Gilman (1960), "The pronouns of power and solidarity", in Thomas A. Sebeok, editor, Style in Language, pages 253-276, incorporated herein by reference). This involved manually inspecting each translation to assess whether the model used tu (informal) or usted (formal), either explicitly or implicitly through verb conjugations. The results are presented in Table 5 of FIG. 12.

It can be seen that for the informal translations, the model almost exclusively uses tu. By contrast, when generating formal translations, the outputs are more varied, with the model often avoiding second person forms entirely. For example, the rewriter's formal translation for the sentence "This will allow you to turn on certain features: is "Esto permitirá activar determinadas funciones", which translates to "This allows one to activate certain features." Nevertheless, it can be seen that the automatic evaluation shows the same trend observed in the human evaluation.

Overall, these results demonstrate that the multilingual (universal) rewriting model is capable of zero-shot transfer of the (broadly construed) notion of formality provided by English exemplars onto other languages.

Method of Operation

Figure 13A:
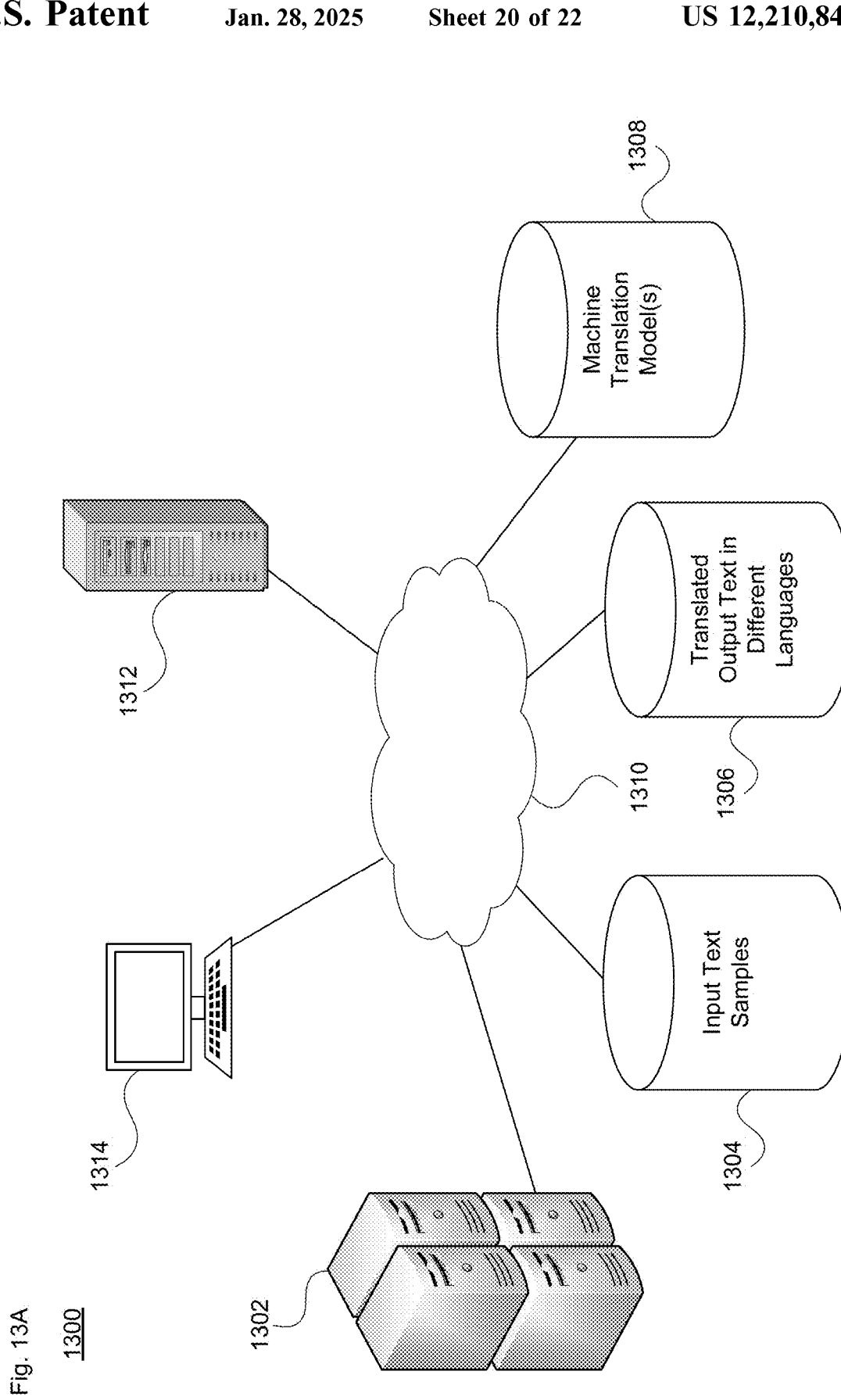
FIGS. 13A-B illustrate a system for use with aspects of the technology.
Figure 13B:
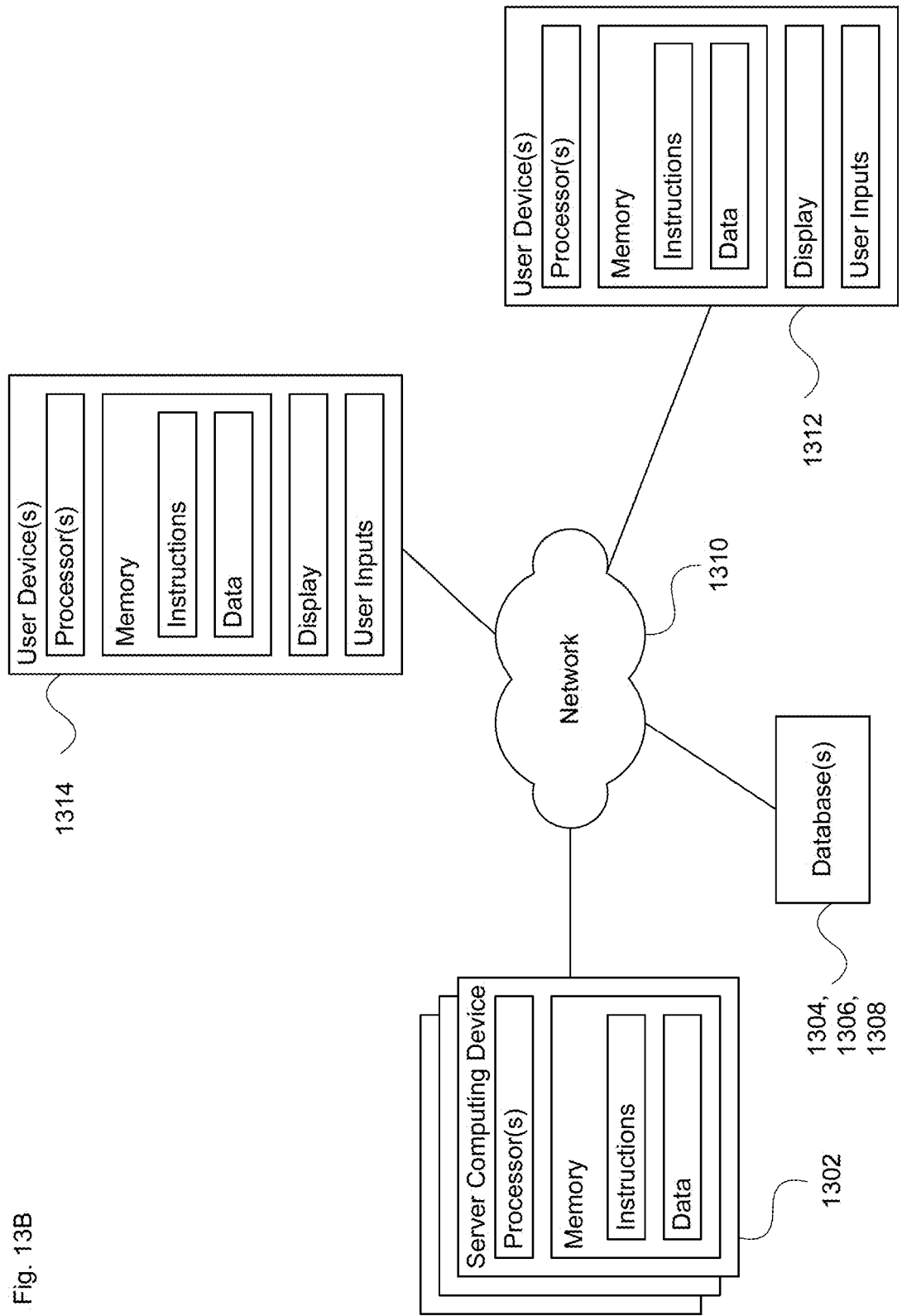

In view of the above discussion, an overall approach for training the multilingual text rewriting model can include obtaining one or more text strings for every language to be supported, extracting 2 sub-spans of text and tokenizing them. The process can randomly replace tokens to corrupt them. The spans are passed through the encoder to reuse mT5 model (or equivalent model). Untouched spans are passed through the encoder to extract the style. Note that the style is effectively an attribute, which can encompass any one (or more) of: formality, positive v. negative, dialect, author style, magazine style, food items, movie items, or even something that could be changed about a sentence while leaving other attributes the same. The style vector is added to the outputs of encoder model, and that combination is input to the decoder model (in which or more stochastic tuning ranges provide extra conditioning). The resultant multilingual model can handle not only sentences, but even random spans of text. It consumes exemplars in one language and extracts results in a different language, Example Computing Architecture TPU, GPU, CPU or other computing architectures can be employed to implement aspects of the technology in accordance with the features disclosed herein. One example computing architecture is shown in FIGS. 13A and 13B. In particular, FIGS. 13A and 13B are pictorial and functional diagrams, respectively, of an example system 1300 that includes a plurality of computing devices and databases connected via a network. For instance, computing device(s) 1302 may be a cloud-based server system. Databases 1304, 1306 and 1308 may store, e.g., a corpus of source text (e.g., sentences, sentence fragment, or larger text samples), a corpus of translated output text for each source text element in one or more different languages, and one or more machine translation models for text rewriting, respectively. The server system may access the databases via network 1310. One or more user devices or systems may include a computing system 1312 and a desktop computer 1314, for instance to provide source text segment and/or other information to the computing device(s) 1302.

As shown in FIG. 13B, each of the computing devices 1302 and 1312-1314 may include one or more processors, memory, data and instructions. The memory stores information accessible by the one or more processors, including instructions and data (e.g., machine translation model(s), corpus information, style extractors, corruption types, exemplars, etc.) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available GPUs, CPUs, TPUs, etc. Alternatively, each processor may be a dedicated device such as an ASIC or other hardware-based processor. Although FIG. 13B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 1302. Accordingly, references to a processor or computing device will be understood to include references to a collection of processors or computing devices or memories that may or may not operate in parallel.

The data, such as source text files or text segment and/or translated output text in multiple languages, may be operated on by the system to train one or more models. This can include filtering or curating the input dataset(s). The trained models may be used on textual input to provide translated text to one or more users, for instance users of computers 1312 and/or 1314.

Such computers may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 1312-1314) may communicate with a back-end computing system (e.g., server 1302) via one or more networks, such as network 1310. The network 1310, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1302 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1302 may include one or more server computing devices that are capable of communicating with any of the computing devices 1312-1314 via the network 1310.

FIG. 14 illustrates a process 1400 in accordance with aspects of the technology, which involves a computer-implemented method for providing multilingual text rewriting according to a machine learning model. At block 1402, the method comprising obtaining an input text sequence based on a set of text exemplars in a source language, and at block 1404 it comprises generating, by a corruption module, a corrupted version of the input text sequence. At block 1406 it includes receiving, by an encoder neural network of an encoder module, the corrupted version of the input text sequence. At block 1408 it includes generating, by the encoder module, a set of encoded representations of the corrupted version of the input text sequence. At block 1410 the method includes extracting, by a style extractor module, a set of style vector representations associated with the input text sequence. At block 1412 it includes receiving, by a decoder neural network of a decoder module, the set of encoded representations and the set of style vector representations, in which each style vector representation of the set is added element-wise to one of the set of encoded representations. At block 1414 the method includes outputting, by the decoder module, a set of rewritten texts in a plurality of languages different from the source language, and at block 1416 it includes storing the rewritten text in selected ones of the plurality of languages according to a change in a least a sentiment or a formality of the input text sequence. In this method, a set of model weights is shared by the encoder module and the style extractor module, and a unique token is appended to the input text sequence for style extraction instead of mean-pooling all of the style vector representations in the set.

The universal rewriter models discussed herein are extremely robust and are suitable for use with a number of computer-focused applications. This can include translation services from one language to another (or many), healthcare applications that support patients who may be most comfortable communicating in their native language, video streaming services that provide subtitles in a number of selectable languages, and videoconferencing services that may support a real-time closed-captioning feature for the users.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system configured for a multilingual text rewriting model, the system comprising:
   memory configured to store a set of text exemplars in a source language and a set of rewritten texts in a plurality of languages different from the source language; and
   one or more processing elements operatively coupled to the memory, the one or more processing elements implementing a multilingual text rewriter as a neural network having:
   a corruption module configured to generate a corrupted version of an input text sequence obtained based on the set of text exemplars in the source language stored in the memory, the corruption module employing a corruption function that uses negation of an attribute vector associated with the input text sequence;
   an encoder module comprising an encoder neural network configured to receive the corrupted version of the input text sequence from the corruption module and to generate a set of encoded representations of the corrupted version of the input text sequence;
   a style extractor module configured to extract a set of style vector representations associated with the input text sequence; and
   a decoder module comprising a decoder neural network configured to receive the set of encoded representations of the corrupted version of the input text sequence and the set of style vector representations and to output the set of rewritten texts in the plurality of languages, each style vector representation of the set being added element-wise to one of the set of encoded representations of the corrupted version of the input text sequence;
   wherein a set of model weights is shared by the encoder module and the style extractor module, and a unique token is appended to the input text sequence for style extraction instead of mean-pooling all of the style vector representations in the set; and
   wherein the system is configured to provide rewritten texts in selected ones of the plurality of languages according to a change in a least a sentiment or a formality of the input text sequence.

2. The system of claim 1, wherein the encoder module, the style extractor module and the decoder module are configured as transformer stacks initialized from a common pre-trained language model.

3. The system of claim 1, wherein both the encoder module and the decoder module are attention-based neural network modules.

4. The system of claim 1, wherein the corruption function is a corruption function C for a given pair of non-overlapping spans (s1, s2) of the input text sequence, so that the multilingual text rewriting model is capable of reconstructing span s2 from C(s2) and Vs1, where Vs1 is the attribute vector of span s1.

5. The system of claim 4, wherein the corruption function C is as follows:

$$C := f(\bullet, \text{source language}, -Vs1).$$

6. The system of claim 1, wherein the style extractor module includes a set of style extractor elements including a first subset configured to operate on different style exemplars and a second subset configured to operate on the input text sequence prior to corruption by the corruption module.

7. The system of claim 1, wherein during training the corruption module is configured to employ at least one of token-level corruption or style-aware back-translation corruption.

8. The system of claim 1, wherein the set of model weights is initialized with the weights of a pretrained text-to-text model.

9. The system of claim 1, wherein the model weights for the style extractor module are not tied to the weights of the encoder module during training.

10. The system of claim 1, wherein the system is configured to extract pairs of random non-overlapping spans of tokens from each line of text in a given text exemplar, and configured to use a first-occurring span in the text as an exemplar of attributes of a second span in the text.

11. The system of claim 1, wherein a cross-lingual learning signal is added to a training objective for training the model.

12. The system of claim 1, wherein the encoder module is configured to use negation of a true exemplar vector associated with the input text sequence as the attribute vector in a forward pass operation.

13. The system of claim 1, wherein the decoder module is configured to receive a set of stochastic tuning ranges that provide conditioning for the decoder module.

14. The system of claim 1, wherein:
the set of style vector representations corresponds to a set of attributes associated with the input text sequence; and
the system is configured to input a set of exemplars illustrating defined attributes and to extract corresponding attribute vectors for use in rewriting the input text sequence into the plurality of languages according to the defined attributes.

15. The system of claim 14, wherein:
the system is configured to form an attribute delta vector including a scale factor; and
the attribute delta vector is added to the set of encoded representations of the corrupted version of the input text sequence before processing by the decoder module.

16. A computer-implemented method for providing multilingual text rewriting according to a machine learning model, the method comprising:
obtaining an input text sequence based on a set of text exemplars in a source language stored in a memory;
generating, by a corruption module, a corrupted version of the input text sequence, the corruption module employing a corruption function that uses negation of an attribute vector associated with the input text sequence;
receiving, by an encoder neural network of an encoder module, the corrupted version of the input text sequence from the corruption module;
generating, by the encoder module, a set of encoded representations of the corrupted version of the input text sequence;
extracting, by a style extractor module, a set of style vector representations associated with the input text sequence;
receiving, by a decoder neural network of a decoder module, the set of encoded representations of the corrupted version of the input text sequence and the set of style vector representations, in which each style vector representation of the set is added element-wise to one of the set of encoded representations of the corrupted version of the input text sequence;
outputting, by the decoder module, a set of rewritten texts in a plurality of languages different from the source language; and
storing the rewritten texts in selected ones of the plurality of languages according to a change in a least a sentiment or a formality of the input text sequence;
wherein a set of model weights is shared by the encoder module and the style extractor module, and a unique token is appended to the input text sequence for style extraction instead of mean-pooling all of the style vector representations in the set.

17. The method of claim 16, wherein the corruption function is a corruption function C for a given pair of non-overlapping spans (s1, s2) of the input text sequence, so that the machine learning model is capable of reconstructing span s2 from C(s2) and Vs1, where Vs1 is the attribute vector of span s1.

18. The method of claim 16, further comprising:
extracting pairs of random non-overlapping spans of tokens from each line of text in a given text exemplar; and
using a first-occurring span in the text as an exemplar of attributes of a second span in the text.

19. The method of claim 16, further comprising adding a cross-lingual learning signal to a training objective for training the model.

20. The method of claim 16, further comprising applying a set of stochastic tuning ranges to selectively condition the decoder module.

21. The method of claim 16, wherein:
the set of style vector representations corresponds to a set of attributes associated with the input text sequence; and
outputting the set of rewritten texts includes generating one or more versions of the input text sequence in selected ones of the plurality of languages according to the set of attributes.

22. A non-transitory computer-readable medium storing instructions which, when executed, cause a computing device to perform a method of providing multilingual text rewriting according to a machine learning model, the method comprising:
obtaining an input text sequence based on a set of text exemplars in a source language stored in a memory;
generating, by a corruption module, a corrupted version of the input text sequence, the corruption module employing a corruption function that uses negation of an attribute vector associated with the input text sequence;
receiving, by an encoder neural network of an encoder module, the corrupted version of the input text sequence from the corruption module;
generating, by the encoder module, a set of encoded representations of the corrupted version of the input text sequence;
extracting, by a style extractor module, a set of style vector representations associated with the input text sequence;

receiving, by a decoder neural network of a decoder module, the set of encoded representations of the corrupted version of the input text sequence and the set of style vector representations, in which each style vector representation of the set is added element-wise to one of the set of encoded representations of the corrupted version of the input text sequence;

outputting, by the decoder module, a set of rewritten texts in a plurality of languages different from the source language; and storing the rewritten texts in selected ones of the plurality of languages according to a change in a least a sentiment or a formality of the input text sequence;

wherein a set of model weights is shared by the encoder module and the style extractor module, and a unique token is appended to the input text sequence for style extraction instead of mean-pooling all of the style vector representations in the set.

23. The non-transitory computer-readable medium of claim 22, wherein the corruption function is a corruption function C for a given pair of non-overlapping spans (s1, s2) of the input text sequence, so that the machine learning model is capable of reconstructing span s2 from C(s2) and Vs1, where Vs1 is the attribute vector of span s1.

24. The non-transitory computer-readable medium of claim 22, wherein the method further comprises:

extracting pairs of random non-overlapping spans of tokens from each line of text in a given text exemplar; and using a first-occurring span in the text as an exemplar of attributes of a second span in the text.

25. The non-transitory computer-readable medium of claim 22, wherein the method further comprises adding a cross-lingual learning signal to a training objective for training the model.

* * * * *